United States Patent
Drummond et al.

(10) Patent No.: US 9,512,593 B2
(45) Date of Patent: Dec. 6, 2016

(54) ANTI-TORSION ANCHOR BOLT

(71) Applicant: SR Systems, LLC, Tuscaloosa, AL (US)

(72) Inventors: Scott Drummond, Tuscaloosa, FL (US); Steve Zimmerman, Linden, AL (US); Van T. Walworth, Lebanon, TN (US); Tommy DuPuy, Lebanon, TN (US)

(73) Assignee: SR Systems, LLC, Tuscaloosa, AL (US)

( * ) Notice: Subject to any disclaimer, the term of this patent is extended or adjusted under 35 U.S.C. 154(b) by 0 days.

(21) Appl. No.: 14/801,118

(22) Filed: Jul. 16, 2015

(65) Prior Publication Data
US 2016/0017594 A1 Jan. 21, 2016

Related U.S. Application Data

(60) Provisional application No. 62/025,271, filed on Jul. 16, 2014.

(51) Int. Cl.
*E04B 1/41* (2006.01)
*E02D 27/01* (2006.01)

(52) U.S. Cl.
CPC ............. *E02D 27/01* (2013.01); *E04B 1/4121* (2013.01)

(58) Field of Classification Search
CPC ........... E04B 1/41; E04B 1/4157; E02D 27/01
See application file for complete search history.

(56) References Cited

U.S. PATENT DOCUMENTS

| | | | | |
|---|---|---|---|---|
| 3,212,390 A | * | 10/1965 | Litzkow | E03D 11/14 411/436 |
| 3,630,474 A | * | 12/1971 | Minor | E01F 9/635 248/159 |
| 3,719,984 A | * | 3/1973 | Frishof | B21D 51/04 138/96 R |
| 3,854,371 A | * | 12/1974 | Lamothe | F16B 37/14 138/96 T |
| 4,162,596 A | * | 7/1979 | Damman | E04B 1/4164 248/634 |

(Continued)

FOREIGN PATENT DOCUMENTS

| | | |
|---|---|---|
| JP | 2001-132110 A | 5/2001 |
| KR | 2005-0043125 A | 5/2005 |

(Continued)

OTHER PUBLICATIONS

International Search Report and Written Opinion of the International Searching Authority for PCT/US2015/040764 mailed Sep. 24, 2015.

*Primary Examiner* — Jeanette E Chapman

(57) ABSTRACT

An anchor bolt device for securing a structural member to a concrete foundation is described. The anchor bolt device includes a first anchor bolt, which has an enlarged portion, a shank portion, and a tail portion. The enlarged portion extends from a first end of the first anchor bolt and has an enlarged portion cross-section. The tail portion extends from a second end of the first anchor bolt and has a tail portion cross-section. The shank portion is disposed between the enlarged portion and the tail portion and has a shank portion cross-section that is smaller than the enlarged portion cross-section. A first coupling is disposed at the first end of the first anchor bolt for securing the first anchor bolt to the structural member. A second anchor bolt may be coupled to the second end of first anchor bolt at a second coupling.

25 Claims, 20 Drawing Sheets

(56) References Cited

U.S. PATENT DOCUMENTS

| | | | | |
|---|---|---|---|---|
| 4,872,298 A * | 10/1989 | Klemic, Jr. | ............ | E04B 1/4157 52/127.1 |
| 4,932,818 A * | 6/1990 | Garwood | .............. | E04B 1/4157 411/107 |
| 4,982,550 A * | 1/1991 | Vidal | .................. | E02D 29/0266 52/295 |
| 5,050,364 A * | 9/1991 | Johnson | ................ | E04B 1/4157 52/295 |
| 5,060,436 A * | 10/1991 | Delgado, Jr. | ......... | B28B 23/005 52/295 |
| 7,103,984 B2 * | 9/2006 | Kastberg | ............... | E04G 21/185 33/518 |
| 7,596,915 B2 * | 10/2009 | Lee | ......................... | E02D 31/02 249/142 |
| 2005/0120666 A1 | 6/2005 | Alyea et al. | | |
| 2007/0095004 A1 * | 5/2007 | Heath | .................... | E04B 1/4157 52/741.1 |
| 2009/0272053 A1 * | 11/2009 | Dent | ....................... | E02D 27/32 52/296 |
| 2012/0255402 A1 * | 10/2012 | Friend | ..................... | B25B 13/48 81/436 |
| 2013/0067831 A1 * | 3/2013 | Zimmerman | ......... | E04B 1/4121 52/105 |

FOREIGN PATENT DOCUMENTS

| | | |
|---|---|---|
| KR | 2006-0017500 A | 2/2006 |
| KR | 2014-0003938 A | 1/2014 |
| SE | 201300408 A1 * | 12/2014 |

* cited by examiner

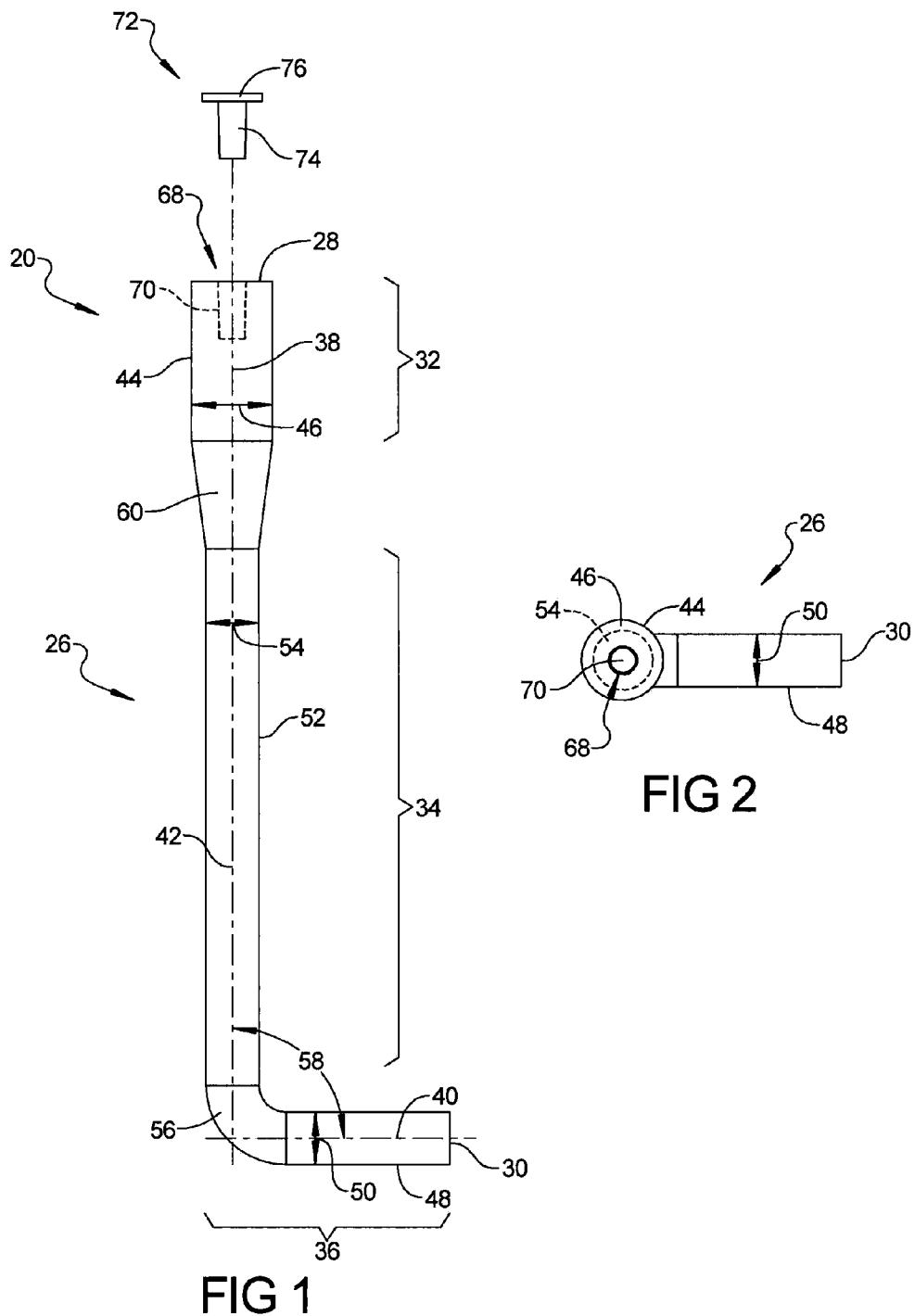

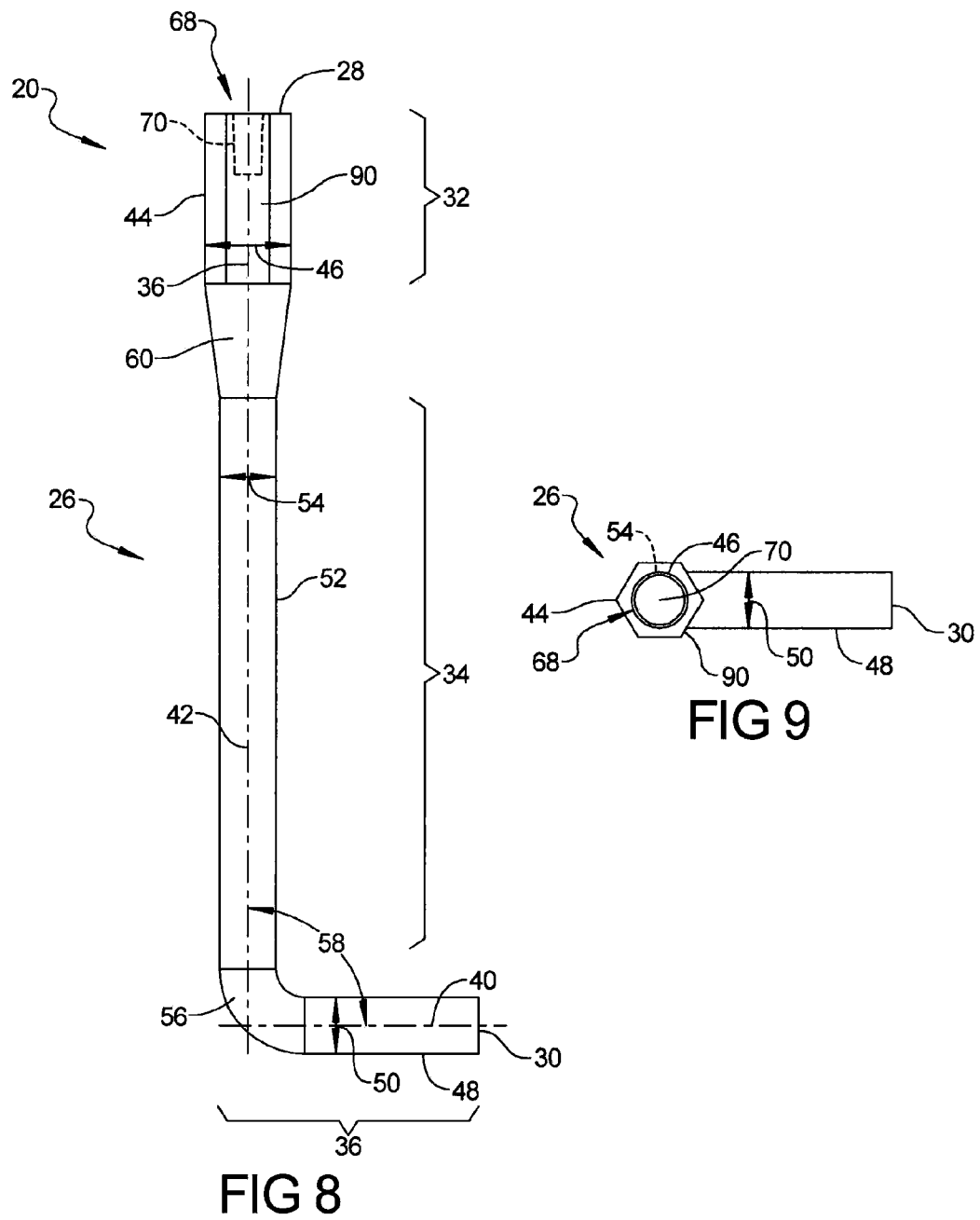

ANTI-TORSION ANCHOR BOLT

CROSS REFERENCE TO RELATED APPLICATIONS

This application claims the benefit of U.S. Provisional Application No. 62/025,271, filed Jul. 16, 2014. The entire disclosure of the above application is incorporated herein by reference.

FIELD

The subject disclosure generally relates to anchor bolts. By way of example and without limitation, anchor bolts are commonly used in the construction industry for securing structural components to a concrete foundation, where at least a portion of the anchor bolt is embedded in the concrete foundation.

BACKGROUND

This section provides background information related to the present disclosure and is not necessarily prior art.

In the construction industry, anchor bolts are well known devices that are commonly used to secure walls and other building structures to a concrete foundation. Traditionally, anchor bolts are formed of a steel rod that has an "L" like shape. The horizontally extending base of the "L" shape is commonly referred to as the tail of the anchor bolt, while the vertically extending portion of the "L" shape is commonly referred to as the shank of the anchor bolt. The end of the shank that is positioned opposite the tail is externally threaded and is thus configured to receive a nut. Typically, anchor bolts are either placed before the concrete foundation is poured or are set in the concrete foundation while the concrete is still wet (i.e. after the concrete foundation has been poured, but before the concrete foundation has cured). In either scenario, the anchor bolts may be temporarily held in place as the concrete foundation cures by mounting templates that are nailed to form boards of the concrete foundation. Alternatively, the anchor bolts may be held in place while the concrete foundation cures by anchor bolt floats that rest on top of the concrete foundation. Once the concrete foundation has cured, such form boards, mounting templates, and/or anchor bolt floats are removed and discarded, such that the threaded ends of the anchor bolts are left protruding from the concrete foundation. Holes aligned with the threaded ends of the anchor bolts are then drilled in one or more structural members of the wall. The structural members of the wall are then placed over the anchor bolts such that the threaded ends of the anchor bolts extend through the holes. Nuts are then threaded onto the threaded ends of the anchor bolts and the nuts are tightened down against the structural members of the wall, completing the installation process.

Traditional anchor bolts create a safety hazard before the structural members of the wall are placed over the anchor bolts because the threaded ends of the anchor bolts protrude from the mounting surface of the concrete foundation. As such, construction workers or other individuals walking on the concrete foundation can trip on or otherwise be injured by the threaded ends of the anchor bolts. In addition, traditional anchor bolts come in a wide variety of sizes and configurations, which are application specific. Builders must consider the various types of anchor bolts available and select a type of anchor bolt that will work well in the particular concrete foundation in which they will be placed. If an inappropriate anchor bolt is selected or if on-the-job changes are made to the concrete foundation, delays and inconvenience can occur, where a different type of anchor bolt has to be ordered. This is particularly onerous because concrete deliveries must be rescheduled and other work requiring the completed concrete foundation may have to be delayed. Accordingly, there remains a need for an anchor-bolt device that has improved safety and greater in-field flexibility.

SUMMARY

This section provides a general summary of the disclosure, and is not a comprehensive disclosure of its full scope or all of its features.

In accordance with one aspect of the subject disclosure, an anchor bolt device is provided for securing a structural member to a concrete foundation. The anchor bolt device includes a first anchor bolt. The first anchor bolt extends between a first end and a second end and has an enlarged portion, a shank portion, and a tail portion. The enlarged portion of the first anchor bolt extends from the first end of the first anchor bolt along an enlarged portion centerline. The enlarged portion of the first anchor bolt has an enlarged portion cross-section that is transverse to the enlarged portion centerline of the first anchor bolt. The tail portion of the first anchor bolt extends from the second end of the first anchor bolt along a tail portion centerline. The tail portion of the first anchor bolt has a tail portion cross-section that is transverse to the tail portion centerline of the first anchor bolt. The shank portion of the first anchor bolt is disposed between the enlarged portion and the tail portion of the first anchor bolt and extends along a shank portion centerline. The shank portion of the first anchor bolt has a shank portion cross-section that is transverse to the shank portion centerline of the first anchor bolt. The shank portion cross-section is smaller than the enlarged portion cross-section. A first coupling is disposed at the first end of the first anchor bolt for securing the first anchor bolt to the structural member. The first coupling includes a female tap portion that extends inwardly from the first end of the first anchor bolt into the enlarged portion of the first anchor bolt.

In accordance with another aspect of the subject disclosure, the anchor bolt device includes a first anchor bolt and a second anchor bolt. The second anchor bolt is coupled to and extends from the first anchor bolt. Each of the first and second anchor bolts extends between first and second ends and each of the first and second anchor bolts has an enlarged portion, a shank portion, and a tail portion. The enlarged portions of the first and second anchor bolts extend from the first ends of the first and second anchor bolts, respectively, along enlarged portion centerlines. The enlarged portions of the first and second anchor bolts have enlarged portion cross-sections that are transverse to the enlarged portion centerlines. The tail portions of the first and second anchor bolts extend from the second ends of the first and second anchor bolts, respectively, along tail portion centerlines. The tail portions of the first and second anchor bolts have tail portion cross-sections that are transverse to the tail portion centerlines. The shank portions of the first and second anchor bolts are disposed between the enlarged portions and the tail portions of the first and second anchor bolts, respectively, where the shank portions extend along shank portion centerlines. The shank portions of the first and second anchor bolts have shank portion cross-sections that are transverse to the shank portion centerlines. The shank portion cross-sections of the first and second anchor bolts are smaller than the enlarged portion cross-sections of the first and second anchor bolts. A first coupling is disposed at the first end of said first anchor bolt for securing the first anchor bolt to the structural member and a second coupling is disposed at the first end of the second anchor bolt for coupling the first and second anchor bolts together. The second coupling receives at least part of the tail portion of the first anchor bolt to couple the first anchor bolt to the second anchor bolt.

Accordingly, the anchor bolt devices described herein provide a number of advantages and overcome the short comings of traditional anchor bolts. First, the female tap portion of the first coupling described herein allows the first anchor bolt to be embedded further into the concrete foundation. Unlike the external threads found on traditional anchor bolts, the female tap portion of the first coupling described herein does not need to protrude from the concrete foundation in order to secure the structural members to the first anchor bolt and thus the concrete foundation. Therefore, the first end of the first anchor bolt can be set flush with the mounting surface of the concrete foundation. This creates a safer worksite where construction workers and other individuals do not have to worry about tripping over or being injured by exposed threaded ends of anchor bolts protruding from the concrete foundation. Second, the arrangement of the second coupling described herein allows multiple anchor bolts to be joined together quickly and easily. This provides a field-configurable solution where construction workers can build custom anchor bolt devices in the field to fit the requirements of the concrete foundation and building structure that they are currently working on. This provides greater in-field flexibility and reduces and/or eliminates the drawbacks described above in connection with having to re-order anchor bolts due to errors in the initial selection of anchor bolts and/or on-the-job changes to the concrete foundation.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is an exploded, side elevation view of an exemplary anchor bolt device constructed in accordance with the subject disclosure where the exemplary anchor bolt device includes an enlarged portion having a circular cross-section;

FIG. 2 is a top elevation view of the exemplary anchor bolt device illustrated in FIG. 1;

FIG. 8 is a side elevation view of another exemplary anchor bolt device constructed in accordance with the subject disclosure where the enlarged portion of the exemplary anchor bolt device has a hexagonal cross-section;

FIG. 9 is a top elevation view of the exemplary anchor bolt device illustrated in FIG. 8;

DETAILED DESCRIPTION

Figure 4:
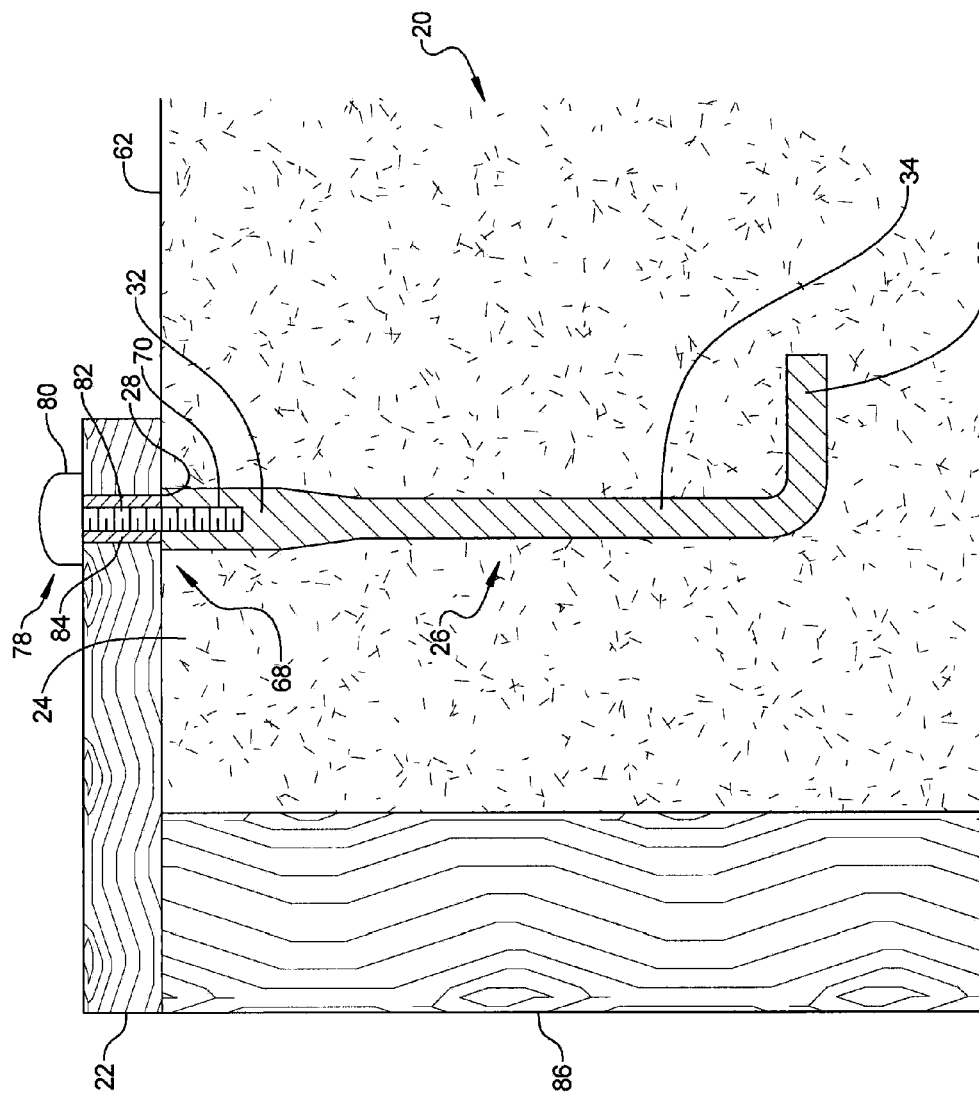
FIG. 4 is a side cross-sectional view of the exemplary anchor bolt device illustrated in FIG. 3 where the exemplary anchor bolt device further comprises a fastener secured to a mounting template.
Figure 5:
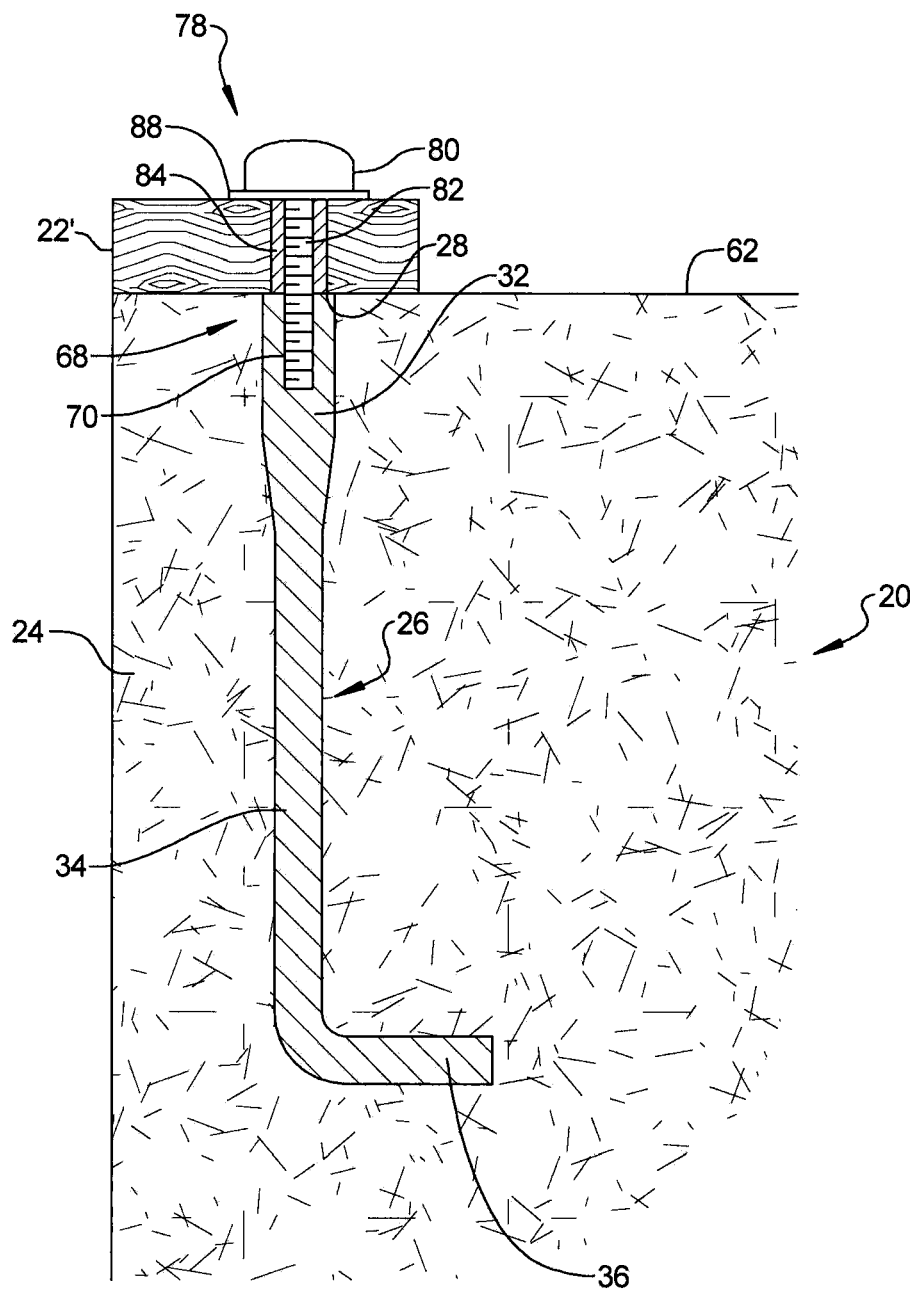
FIG. 5 is another side cross-sectional view of the exemplary anchor bolt device illustrated in FIG. 3 where the exemplary anchor bolt device further comprises a fastener secured to a bottom plate of a wall construction.
Figure 6:
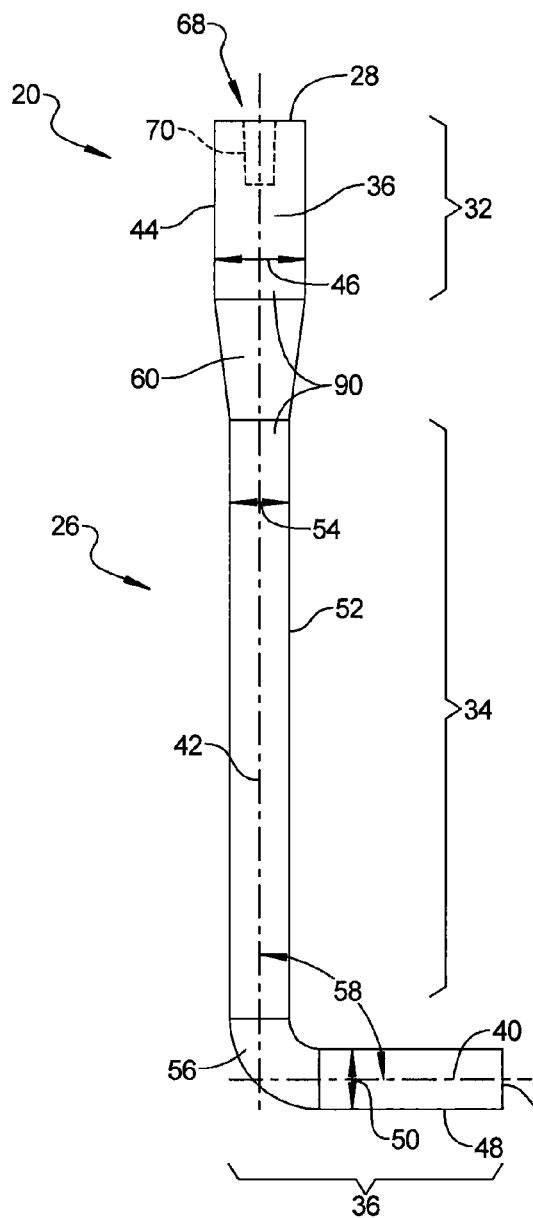
FIG. 6 is a side elevation view of another exemplary anchor bolt device constructed in accordance with the subject disclosure where the enlarged portion of the exemplary anchor bolt device has a rectangular cross-section.
Figure 7:
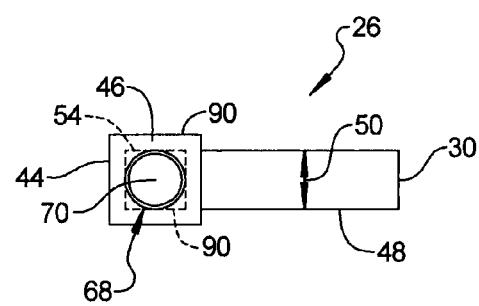
FIG. 7 is a top elevation view of the exemplary anchor bolt device illustrated in FIG. 6.

Referring to the Figures, wherein like numerals indicate corresponding parts throughout the several views, an anchor bolt device 20 is illustrated. It should generally be appreciated that the anchor bolt device 20 disclosed herein may be used for securing a structural member 22, 22' to a concrete foundation 24 (as shown in FIGS. 4 and 5). Typically, the anchor bolt device 20 is pushed into the concrete foundation 24 after the concrete foundation 24 has been poured, but before the concrete foundation 24 has cured. Alternatively, the anchor bolt device 20 may be placed prior to pouring the concrete foundation 24 such that the concrete of the concrete foundation 24 flows around at least part of the anchor bolt device 20 when the concrete foundation 24 is poured. Regardless, the concrete foundation 24 hardens around the anchor bolt device 20 as the concrete foundation 24 cures such that the anchor bolt device 20 provides a point of attachment along the concrete foundation 24, to which the structural member 22, 22' may be attached.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIGS. 1 and 2, a first anchor bolt 26 of the anchor bolt device 20 is illustrated. The first anchor bolt 26 extends between a first end 28 and a second end 30. The first anchor bolt 26 generally includes an enlarged portion 32, a shank portion 34, and a tail portion 36. The enlarged portion 32 of the first anchor bolt 26 extends from the first end 28 of the first anchor bolt 26 along an enlarged portion centerline 38. The tail portion 36 of the first anchor bolt 26 extends from the second end 30 of the first anchor bolt 26 along a tail portion centerline 40. The shank portion 34 of the first anchor bolt 26 is disposed between the enlarged portion 32 and the tail portion 36 of the first anchor bolt 26 and extends along a shank portion centerline 42. As shown in FIGS. 1 and 2, the enlarged portion centerline 38, the shank portion centerline 42, and the tail portion centerline 40 of the first anchor bolt 26 may be straight. Notwithstanding, it should be appreciated that the enlarged portion centerline 38, the shank portion centerline 42, and the tail portion centerline 40 of the first anchor bolt 26 may be non-linear. By way of non-limiting example, at least one of the enlarged portion centerline 38, the shank portion centerline 42, and the tail portion centerline 40 of the first anchor bolt 26 may be curved (not shown).

The enlarged portion 32 of the first anchor bolt 26 has an outside surface 44 disposed between the first end 28 of the first anchor bolt 26 and the shank portion 34 of the first anchor bolt 26. The enlarged portion 32 of the first anchor bolt 26 also has an enlarged portion cross-section 46 that is transverse to the enlarged portion centerline 38 of the first anchor bolt 26. The enlarged portion cross-section 46 of the first anchor bolt 26 may generally be defined as being enclosed (i.e. bounded) by the outside surface 44 of the enlarged portion 32 of the first anchor bolt 26. The tail portion 36 of the first anchor bolt 26 has an exterior surface 48 disposed between the second end 30 of the first anchor bolt 26 and the shank portion 34 of the first anchor bolt 26. The tail portion 36 of the first anchor bolt 26 also has a tail portion cross-section 50 that is transverse to the tail portion centerline 40 of the first anchor bolt 26. The tail portion cross-section 50 of the first anchor bolt 26 may generally be defined as being enclosed (i.e. bounded) by the exterior surface 48 of the tail portion 36 of the first anchor bolt 26. The shank portion 34 of the first anchor bolt 26 has an outer surface 52 that is disposed between the enlarged portion 32 of the first anchor bolt 26 and the tail portion 36 of the first anchor bolt 26. The shank portion 34 of the first anchor bolt 26 also has a shank portion cross-section 54 that is transverse to the shank portion centerline 42 of the first anchor bolt 26. The shank portion cross-section 54 of the first anchor bolt 26 may generally be defined as being enclosed (i.e. bounded) by the outer surface 52 of the shank portion 34 of the first anchor bolt 26. The shank portion cross-section 54 of the first anchor bolt 26 is smaller than the enlarged portion cross-section 46 of the first anchor bolt 26. Meanwhile, the size of the tail portion cross-section 50 of the first anchor bolt 26 relative to the shank portion cross-section 54 of the first anchor bolt 26 may vary. For example, the tail portion cross-section 50 of the first anchor bolt 26 is equal in size to the shank portion cross-section 54 of the first anchor bolt 26 in the configuration illustrated in FIGS. 1 and 2. Alternatively, the tail portion cross-section 50 of the first anchor bolt 26 may be smaller or larger than the shank portion cross-section 54 of the first anchor bolt 26. In the configuration shown in FIGS. 1 and 2, the enlarged portion cross-section 46, the tail portion cross-section 50, and the shank portion cross-section 54 of the first anchor bolt 26 are all circular in shape. Accordingly, the outside surface 44 of the enlarged portion 32 of the first anchor bolt 26, the exterior surface 48 of the tail portion 36 of the first anchor bolt 26, and the outer surface 52 of the shank portion 34 of the first anchor bolt 26 are all cylindrical in shape. Notwithstanding, it should be appreciated that other shapes are possible (FIGS. 6-9) without departing from the scope of the subject disclosure.

With continued reference to FIGS. 1 and 2, the first anchor bolt 26 includes a bend 56 disposed between the shank portion 34 and the tail portion 36 of the first anchor bolt 26. It should be appreciated that at the bend 56 in the first anchor bolt 26, the shank portion centerline 42 and the tail portion centerline 40 of the first anchor bolt 26 intersect one another at a first angle 58. The first angle 58 may range from 85 degrees to 95 degrees. By way of non-limiting example, the first angle 58 is illustrated as 90 degrees in FIGS. 1 and 2. In the configuration shown in FIGS. 1 and 2, the enlarged portion centerline 38 and the shank portion centerline 42 of the first anchor bolt 26 are co-axially aligned. Additionally, the first anchor bolt 26 includes a transition portion 60 disposed between the enlarged portion 32 and the shank portion 34. The transition portion 60 of the first anchor bolt 26 gradually tapers in cross-section moving from the enlarged portion 32 of the first anchor bolt 26 to the shank portion 34 of the first anchor bolt 26. Therefore, the transition portion 60 of the first anchor bolt 26 shown in FIGS. 1 and 2 has a frusto-conical shape. However, other shapes for the transition portion 60 of the first anchor bolt 26 are possible. By way of example and without limitation, the transition portion 60 of the first anchor bolt 26 may be stepped (not shown).

Figure 3:
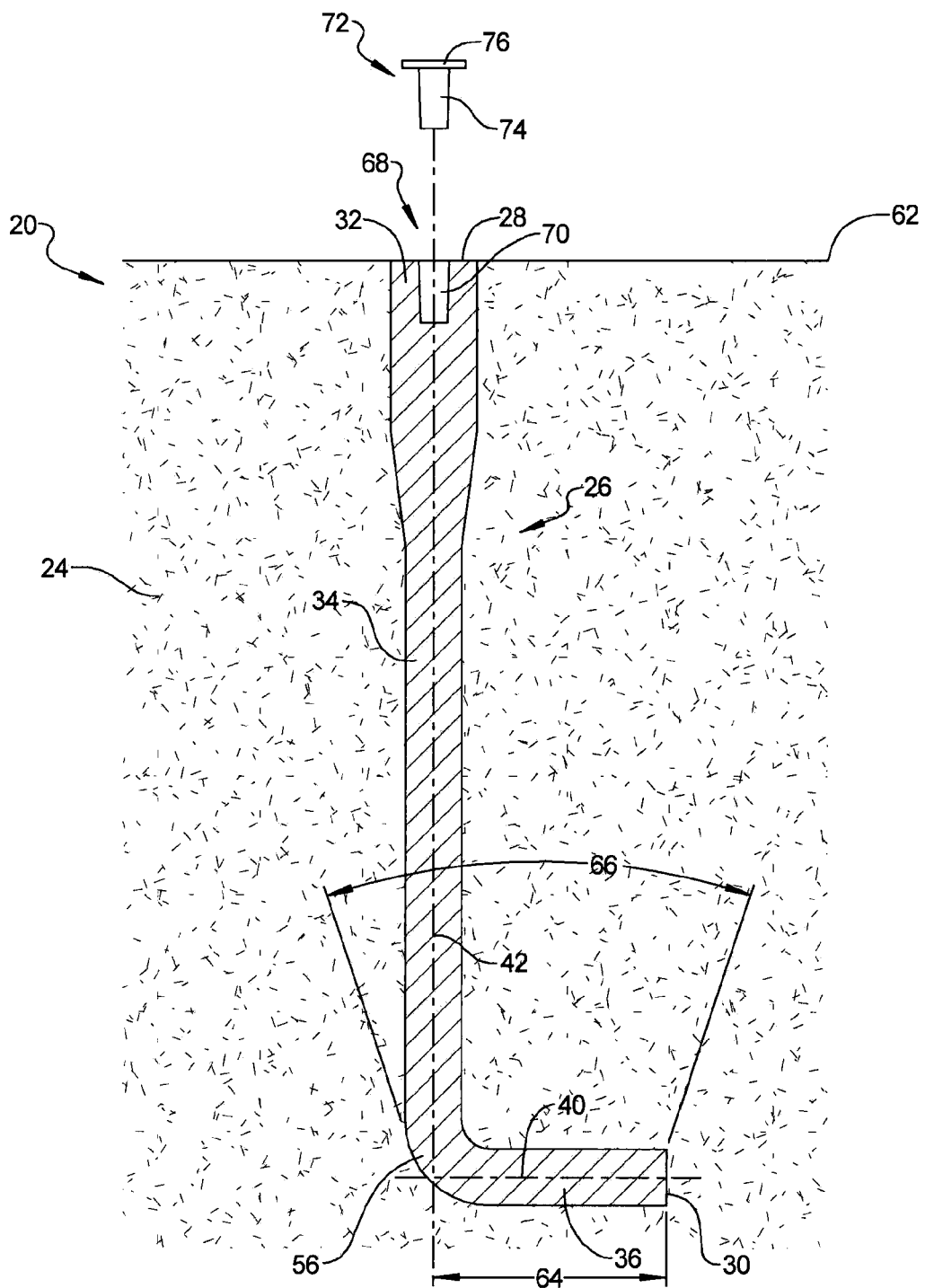
FIG. 3 is a partially exploded, side cross-sectional view of the exemplary anchor bolt device illustrated in FIG. 1 where the exemplary anchor bolt device has been embedded in a concrete foundation.

With further reference to FIG. 3, the first anchor bolt 26 is configured to be at least partially received (i.e. embedded or buried) in the concrete foundation 24. The concrete foundation 24 may generally have a mounting surface 62. By way of example, the concrete foundation 24 may be leveled during curing or otherwise finished so that the mounting surface 62 of the concrete foundation 24 is relatively flat. In many instances, such as that shown in FIG. 3, the mounting surface 62 extends horizontally while at least the enlarged portion 32 and the shank portion 34 of the first anchor bolt 26 extend vertically; however, such orientations are merely illustrative and are not intended to be limiting. The first anchor bolt 26 may be disposed in the concrete foundation 24 such that the first end 28 of the first anchor bolt 26 sits flush with a mounting surface 62 of the concrete foundation 24. Therefore, most of the first anchor bolt 26, including the shank portion 34, the tail portion 36, and the second end 30 of the first anchor bolt 26 are embedded in the concrete foundation 24. Also shown in FIG. 3, the tail portion 36 has a pre-determined length 64 that is measurable along the tail portion centerline 40 between the second end 30 of the first anchor bolt 26 and the intersection between the tail portion centerline 40 and the shank portion centerline 42 at the bend 56 in the first anchor bolt 26. It should be appreciated that the pre-determined length 64 of the tail portion 36 of the first anchor bolt 26 defines a first fracture cone 66 in the concrete foundation 24. The first fracture cone 66 illustrated in FIG. 3 generally extends upwardly from the tail portion 36 of the first anchor bolt 26 in a conical shape that encompasses the shank portion 34 of the first anchor bolt 26. It should be appreciated that the first fracture cone 66 represents a portion of the concrete foundation 24 that opposes removal of the first anchor bolt 26.

With reference to FIGS. 1-5, a first coupling 68 is disposed at the first end 28 of the first anchor bolt 26. The first coupling 68 is configured to secure the first anchor bolt 26 to the structural member 22, 22'. While different arrangements for the first coupling 68 are possible, all of which are considered to be within the scope of the subject disclosure, the first coupling 68 in the illustrated examples includes a female tap portion 70 that extends inwardly from the first end 28 of the first anchor bolt 26 into the enlarged portion 32 of the first anchor bolt 26. The female tap portion 70 of the first anchor bolt 26 may be a bore that is internally threaded and that terminates (i.e. ends) in the enlarged portion 32 of the first anchor bolt 26. As shown in FIGS. 1 and 3, the anchor bolt device 20 may optionally include a thread protector 72 for covering the female tap portion 70 of the first coupling 68. The thread protector 72 includes a plug section 74 sized to be received in the female tap portion 70 of the first coupling 68. When installed in the female tap portion 70 of the first coupling 68, the thread protector 72 protects the female tap portion 70 of the first coupling 68 from splatter when the concrete foundation 24 is being poured, leveled, and/or finished. The thread protector 72 may additionally include a flange section 76 that extends radially outwardly from the plug section 74. The flange section 76 of the thread protector 72 thus contacts the first end 28 of the first anchor bolt 26 when the plug section 74 of the thread protector 72 is received in the female tap portion 70 of the first coupling 68.

Referring to FIGS. 4 and 5, the anchor bolt device 20 further includes a fastener 78 having a head 80 and a shaft 82. The shaft 82 of the fastener 78 is externally threaded and may be inserted into the female tap portion 70 of the first coupling 68. Accordingly, the shaft 82 of the fastener 78 may be threadably retained in the female tap portion 70 of the first coupling 68. As such, the fastener 78 may be used to couple the first anchor bolt 26 to the structural member 22, 22'. As shown in FIGS. 4 and 5, the structural member 22, 22' may rest on the mounting surface 62 of the concrete foundation 24 and may include one or more openings 84 disposed therein. The one or more openings 84 extend entirely through the structural member 22 and are sized to receive the shaft 82 of the fastener 78. In use, the shaft 82 of the fastener 78 is inserted through one of the openings 84 in the structural member 22 and into the female tap portion 70 of the first coupling 68. The head 80 of the fastener 78 is configured to abut the structural member 22 adjacent the opening 84, thus securing the structural member 22 to the enlarged portion 32 of the first anchor bolt 26 as the shaft 82 of the fastener 78 is threaded into the female tap portion 70 of the first coupling 68.

With reference to FIG. 4, the structural member 22, 22' is in the form of a mounting template 22. As FIG. 4 illustrates, one or more form boards 86 may be used to bound the concrete foundation 24. It should be appreciated that such form boards 86 may be used to define the size and shape of the concrete foundation 24 by limiting the flow of concrete as the concrete foundation 24 is poured so that the concrete collects and cures in an area that is bounded by the form boards 86. The mounting template 22 may be used to position the first anchor bolt 26 in the concrete foundation 24. As such, the mounting template 22 rests on the mounting surface 62 of the concrete foundation 24 and may optionally be supported by and fastened to the form boards 86. The mounting template 22 defines the one or more openings 84 that are sized to receive the shaft 82 of the fastener 78. To position the first anchor bolt 26 in the concrete foundation 24, the shaft 82 of the fastener 78 is inserted through one of the openings 84 disposed in the mounting template 22 and is threaded into the female tap portion 70 of the first coupling 68. Once the concrete foundation 24 cures, the fastener 78 may be removed from the female tap portion 70 of the first coupling 68 and withdrawn from the opening 84 in the mounting template. The mounting template 22 and the form boards 86 may then be discarded.

With reference to FIG. 5, the structural member 22, 22' is in the form of a bottom plate 22' of a wall construction (not shown). By way of non-limiting example, the bottom plate 22' may comprise a single board or multiple, stacked boards (such as 2×4, 2×6, 2×8, 2×10, 2×12, 4×4, 6×6, or 8×8 dimensional lumber). As FIG. 5 illustrates, the bottom plate 22' may be positioned on the mounting surface 62 of the concrete foundation 24 for installation thereon. The bottom plate 22' defines the one or more openings 84 that are sized to receive the shaft 82 of the fastener 78. To install the bottom plate 22' on the concrete foundation 24, the shaft 82 of the fastener 78 is inserted through one of the openings 84 disposed in the bottom plate 22' and is threaded into the female tap portion 70 of the first coupling 68 to secure the bottom plate 22' to the enlarged portion 32 of the first anchor bolt 26 and thus the concrete foundation 24. Optionally, a washer 88 having a disc-like shape may be positioned between the head 80 of the fastener 78 and the bottom plate 22'. As such, the washer 88 extends annularly about the shaft 82 of the fastener 78 and helps prevent the head 80 of the fastener 78 from pulling through the bottom plate 22' of the wall construction. Notwithstanding the examples illustrated and described herein, the structural member 22, 22' need not be a mounting template 22 or a bottom plate 22' of a wall construction. Additionally, the structural member 22, 22' may have a variety of different shapes and sizes and may be made from wood or from other materials, including without limitation, various metals.

Figure 10:
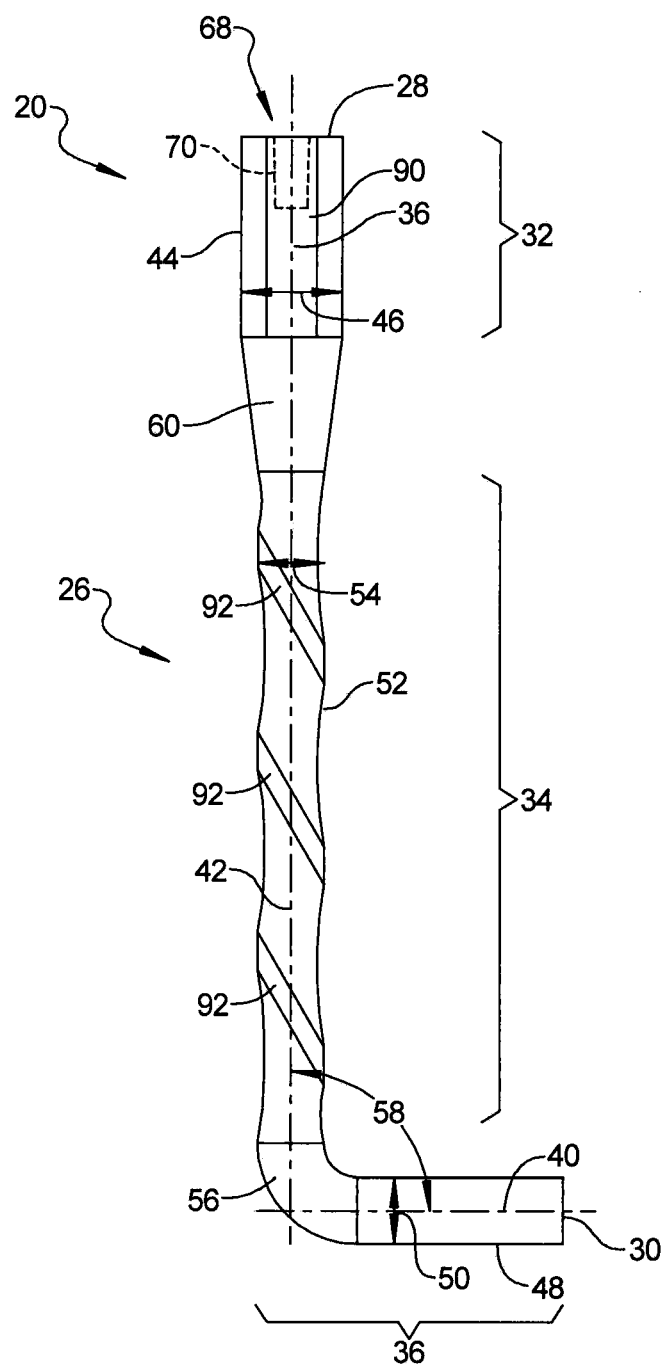
FIG. 10 is a side elevation view of another exemplary anchor bolt device constructed in accordance with the subject disclosure where the exemplary anchor bolt device has a shank portion with twisted flat sections.
Figure 11:
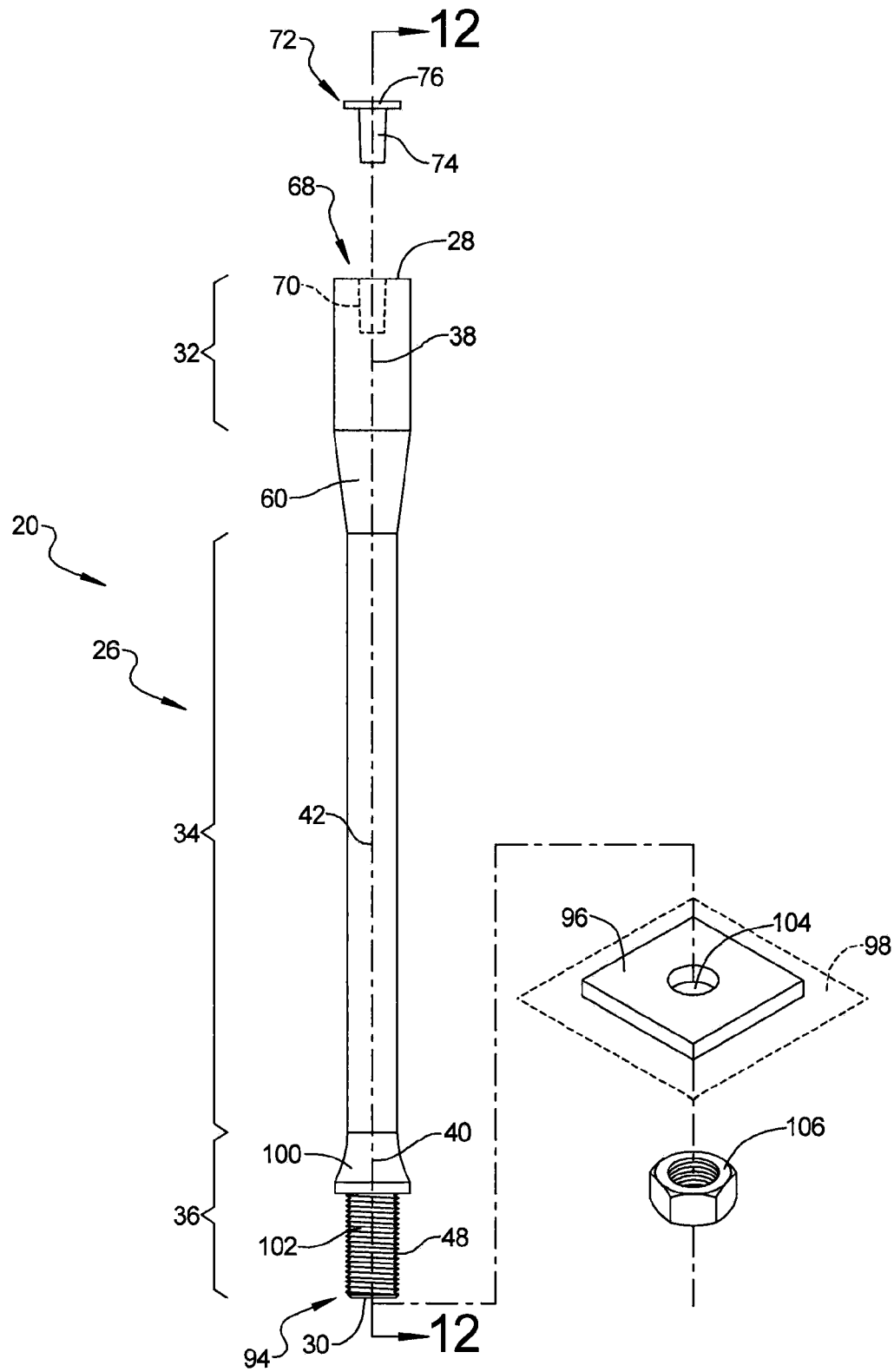
FIG. 11 is an exploded, side elevation view of another exemplary anchor bolt device constructed in accordance with the subject disclosure where the exemplary anchor bolt device includes a stop member.
Figure 12:
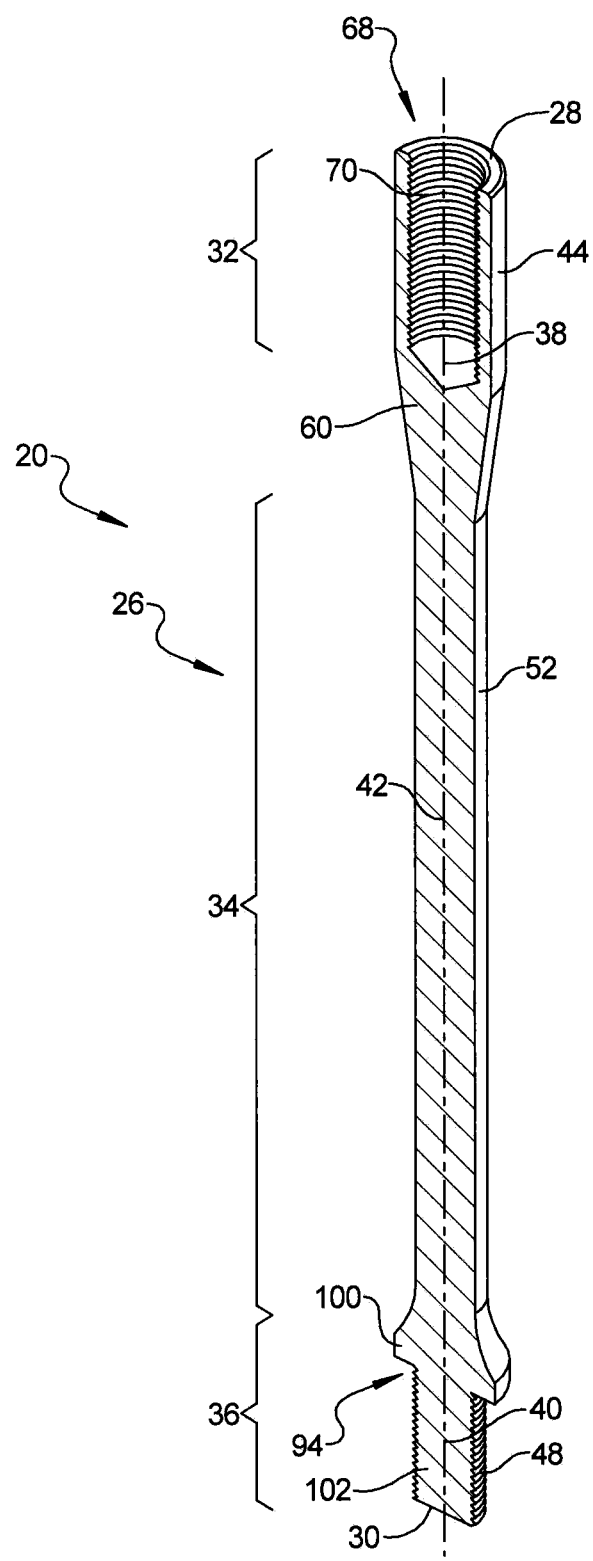
FIG. 12 is a perspective cross-sectional view of the exemplary anchor bolt device illustrated in FIG. 11 taken along line 12-12 in FIG. 11.
Figure 13:
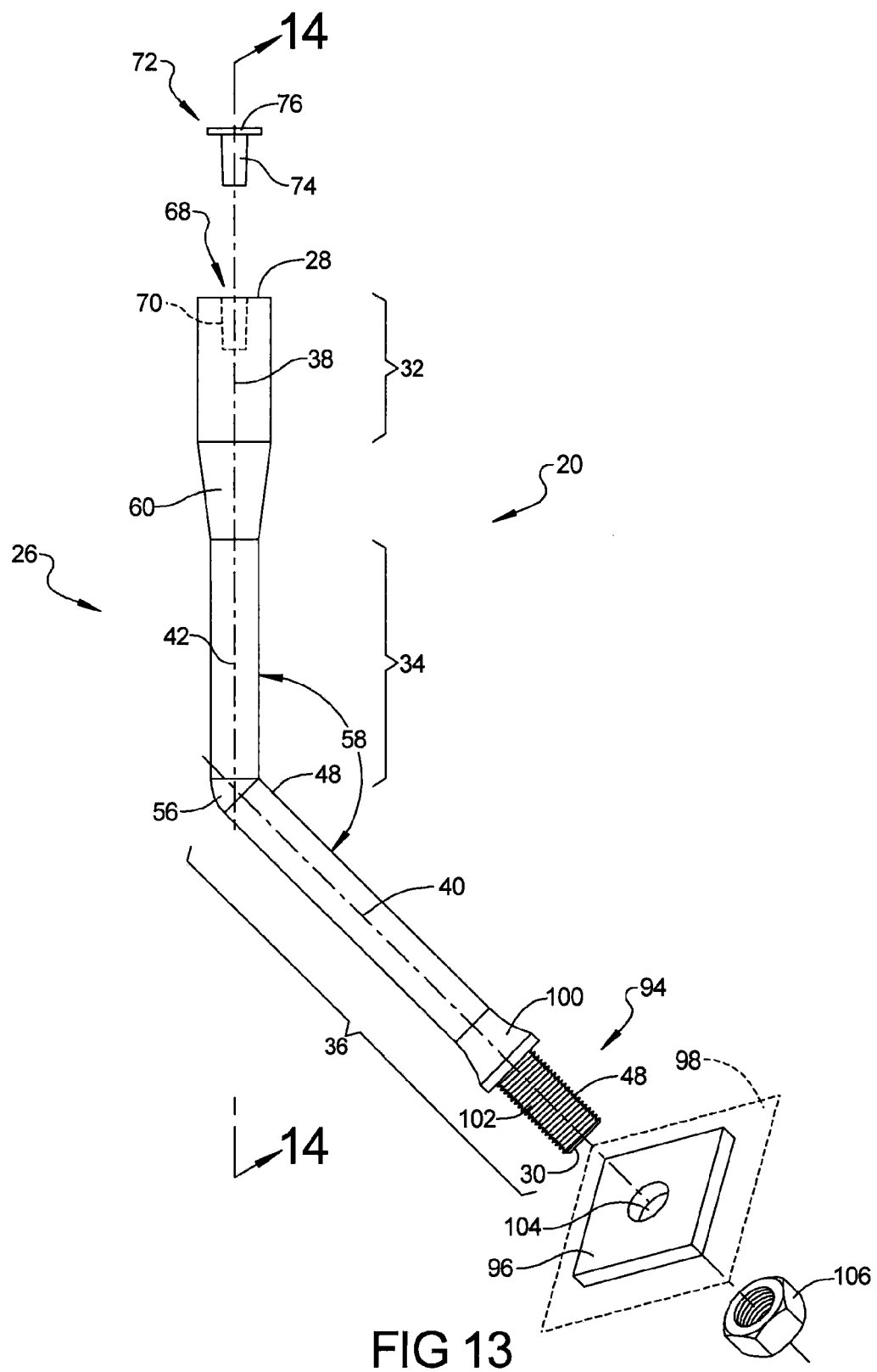
FIG. 13 is an exploded, side elevation view of another exemplary anchor bolt device constructed in accordance with the subject disclosure where the exemplary anchor bolt device includes a bend between a shank portion and a tail portion.
Figure 14:
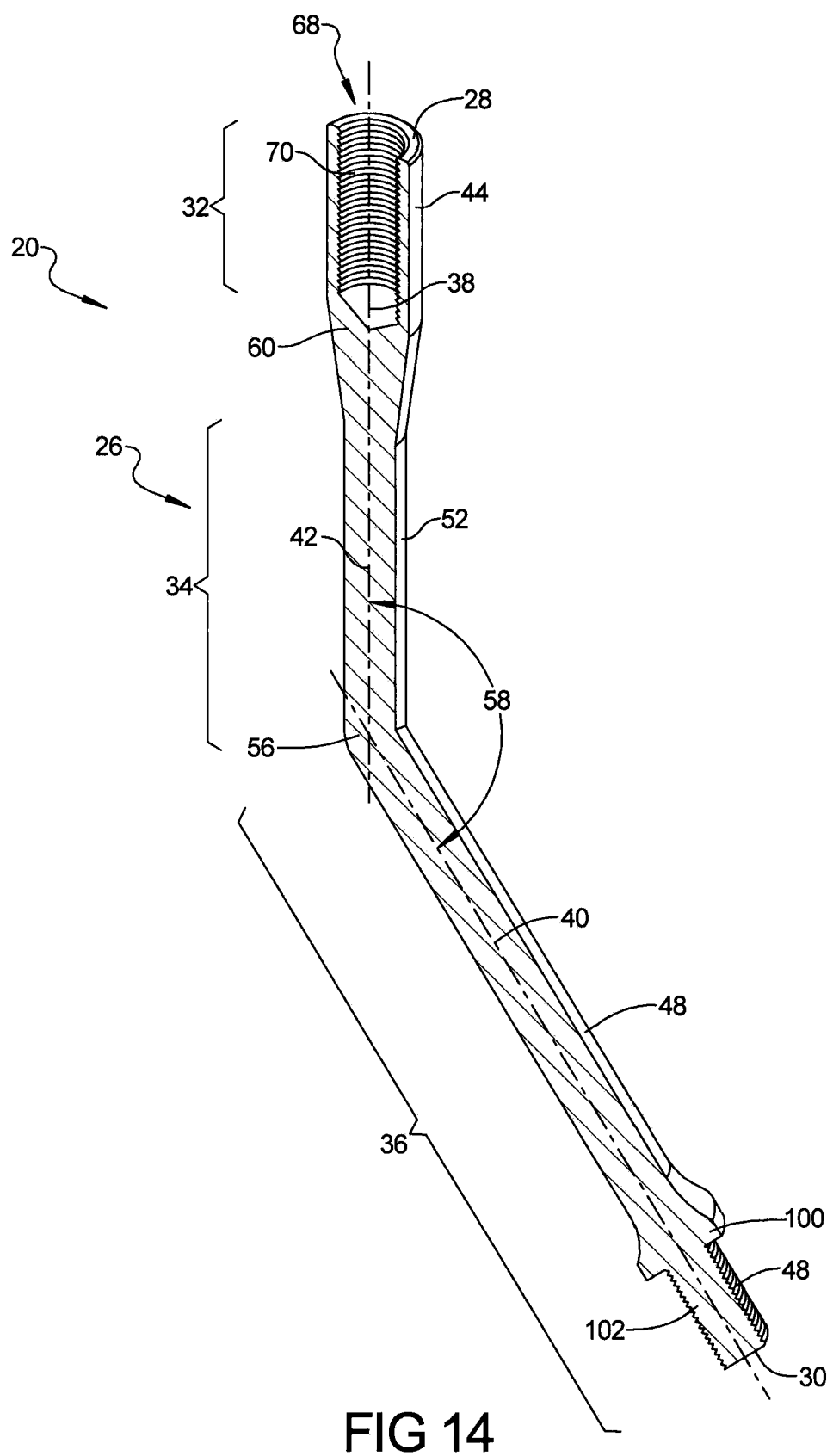
FIG. 14 is a perspective cross-sectional view of the exemplary anchor bolt device illustrated in FIG. 13 taken along line 14-14 in FIG. 13.

It should be appreciated that while the enlarged portion cross-section 46, the tail portion cross-section 50, and the shank portion cross-section 54 of the first anchor bolt 26 are circular in the configuration described above, the first anchor bolt 26 may be constructed such that these elements have a different shape. In addition, the enlarged portion cross-section 46, the tail portion cross-section 50, and the shank portion cross-section 54 of the first anchor bolt 26 may all have the same shape or may have different shapes from one another, where various combinations are possible. For example, in FIGS. 6-9, the enlarged portion cross-section 46 and/or the shank portion cross-section 54 of the first anchor bolt 26 have at least one flat side 90. More specifically, the enlarged portion cross-section 46 and the shank portion cross-section 54 of the first anchor bolt 26 in FIGS. 6 and 7 each have a total of four flat sides 90 and are rectangular in shape. Meanwhile, the tail portion cross-section 50 is circular in shape. In another embodiment shown in FIGS. 8 and 9, the enlarged portion cross-section 46 of the first anchor bolt 26 has a total of six flat sides 90 and is hexagonal in shape. In accordance with this configuration, both the tail portion cross-section 50 and the shank portion cross-section 54 are circular in shape. It should be appreciated that the flat sides 90 oppose rotation of the first anchor bolt 26 within the concrete foundation 24 and therefore help create a more robust mechanical connection between the first anchor bolt 26 and the concrete foundation 24. Yet another variation is illustrated in FIG. 10, where the tail portion cross-section 50 and the shank portion cross-section 54 are circular in shape and where the outer surface 52 of the shank portion 34 of the first anchor bolt 26 has one or more twisted flat sections 92 that extend helically along the shank portion 34 of the first anchor bolt 26. This alternative arrangement is advantageous because the twisted flat sections 92 resist pull-out of the first anchor bolt 26 from the concrete foundation 24.

Referring now to FIGS. 11-14, another embodiment of the anchor bolt device 20 is illustrated where the anchor bolt device 20 includes a second coupling 94 that is disposed at the second end 30 of the first anchor bolt 26. A first stop member 96 is connected to the second end 30 of the first anchor bolt 26 by the second coupling 94. The first stop member 96 extends outwardly away from the exterior surface 48 of the tail portion 36 of the first anchor bolt 26 and defines the first fracture cone 66 in the concrete foundation 24 (shown in FIG. 3). Although the first stop member 96 may have a rectangular plate-like shape that extends in a first stop member plane 98 that is oblique to the tail portion centerline 40, other shapes are possible including, without limitation, non-planar shapes. The second coupling 94 includes a collar 100 that extends outwardly from the exterior surface 48 of the tail portion 36 of the first anchor bolt 26 and a stud 102 disposed between the collar 100 of the second coupling 94 and the second end 30 of the first anchor bolt 26. Although many different shapes and configurations are possible, in the illustrated examples, the collar 100 of the second coupling 94 has a fluted shape, the stud 102 of the second coupling 94 is externally threaded, and the first stop member 96 includes a through-bore 104 that receives the stud 102 of the second coupling 94. A nut 106 is threadably received on the stud 102 of the second coupling 94 for retaining the first stop member 96 on the stud 102 of the second coupling 94. Accordingly, the first stop member 96 is retained between the collar 100 of the second coupling 94 on one side and the nut 106 on the other side when the nut 106 is threaded onto the stud 102 of the second coupling 94. In the configurations where the anchor bolt device 20 is provided with the second coupling 94 at the second end 30 of the first anchor bolt 26, the first anchor bolt 26 may or may not be bent. For example, in the arrangement shown in FIGS. 11 and 12, the enlarged portion centerline 38, the shank portion centerline 42, and the tail portion centerline 40 of the first anchor bolt 26 are co-axially aligned. Alternatively, in the arrangement shown in FIGS. 13 and 14, the first anchor bolt 26 includes bend 56, where the shank portion centerline 42 and the tail portion centerline 40 intersect at the first angle 58. In some arrangements, the first anchor bolt 26 may be constructed such that the first angle 58 between the shank portion centerline 42 and the tail portion centerline 40 at the bend 56 ranges from 40 degrees to 50 degrees. By way of non-limiting example, the first angle 58 is illustrated as 45 degrees in FIGS. 13 and 14.

Referring to FIGS. 15-18, the anchor bolt device 20 further includes a second anchor bolt 108 that is coupled to the tail portion 36 of the first anchor bolt 26 by the second coupling 94. In the examples illustrate, the second anchor bolt 108 generally includes all or most of the elements of the first anchor bolt 26, which are described above. It should be appreciated that where the second anchor bolt 108 is the same as the first anchor bolt 26 (FIGS. 14-16) or nearly the same (FIG. 17), contractors can easily use the first and second anchor bolts 26, 108 singularly or can alternatively build the anchor bolt device 20 described below by joining the first and second anchor bolts 26, 108 together at the second coupling 94. Advantageously, this allows contractors to easily make adjustments in the field because all of the necessary materials are readily at hand, eliminating the need to order specialized anchor bolt devices 20 of different sizes and configurations depending on the size and shape of the concrete foundation 24.

Like the first anchor bolt 26 described above, the second anchor bolt 108 extends between a first end 28 and a second end 30. The second anchor bolt 108 also has an enlarged portion 32', a shank portion 34', and a tail portion 36'. The enlarged portion 32' of the second anchor bolt 108 extends from the first end 28' of the second anchor bolt 108 along an enlarged portion centerline 38'. The enlarged portion 32' of the second anchor bolt 108 has an outside surface 44' and defines an enlarged portion cross-section 46'. The enlarged portion cross-section 46' is arranged transverse to the enlarged portion centerline 38' of the second anchor bolt 108. The tail portion 36' of the second anchor bolt 108 extends from the second end 30' of the second anchor bolt 108 along a tail portion centerline 40'. The tail portion 36' of the second anchor bolt 108 has an exterior surface 48' and defines a tail portion cross-section 50'. The tail portion cross-section 50' is arranged transverse to the tail portion centerline 40' of the second anchor bolt 108. The shank portion 34' of the second anchor bolt 108 is disposed between the enlarged portion 32' and the tail portion 36' of the second anchor bolt 108 and extends along a shank portion centerline 42'. The shank portion 34' of the second anchor bolt 108 has an outer surface 52' and defines a shank portion cross-section 54'. The shank portion cross-section 54' is arranged transverse to the shank portion centerline 42' of the second anchor bolt 108. The shank portion cross-section 54' of the second anchor bolt 108 is smaller than the enlarged portion cross-section 46' of the second anchor bolt 108. In the example illustrated in FIGS. 15-18, the shank portion cross-section 54' of the second anchor bolt 108 is equal in size to the tail portion cross-section 50' of the second anchor bolt 108. However, other configurations are possible where the tail portion cross-section 50' of the second anchor bolt 108 may be larger or smaller than the shank portion cross-section 54' of the second anchor bolt 108.

In accordance with the embodiments shown in FIGS. 15-18, the second coupling 94 includes a female tap portion 70' that extends inwardly from the first end 28' of the second anchor bolt 108 into the enlarged portion 32' of the second anchor bolt 108. The female tap portion 70' of the second coupling 94 may be a bore that is internally threaded and that terminates (i.e. ends) in the enlarged portion 32' of the second anchor bolt 108. Accordingly, the female tap portion 70' of the second coupling 94 (which is disposed in the enlarged portion 32' of the second anchor bolt 108) threadably receives the stud 102 of the second coupling 94 (which is part of the tail portion 36 of the first anchor bolt 26). As such, the tail portion 36 of the first anchor bolt 26 is detachably coupled to the enlarged portion 32' of the second anchor bolt 108 by the second coupling 94.

Figure 15:
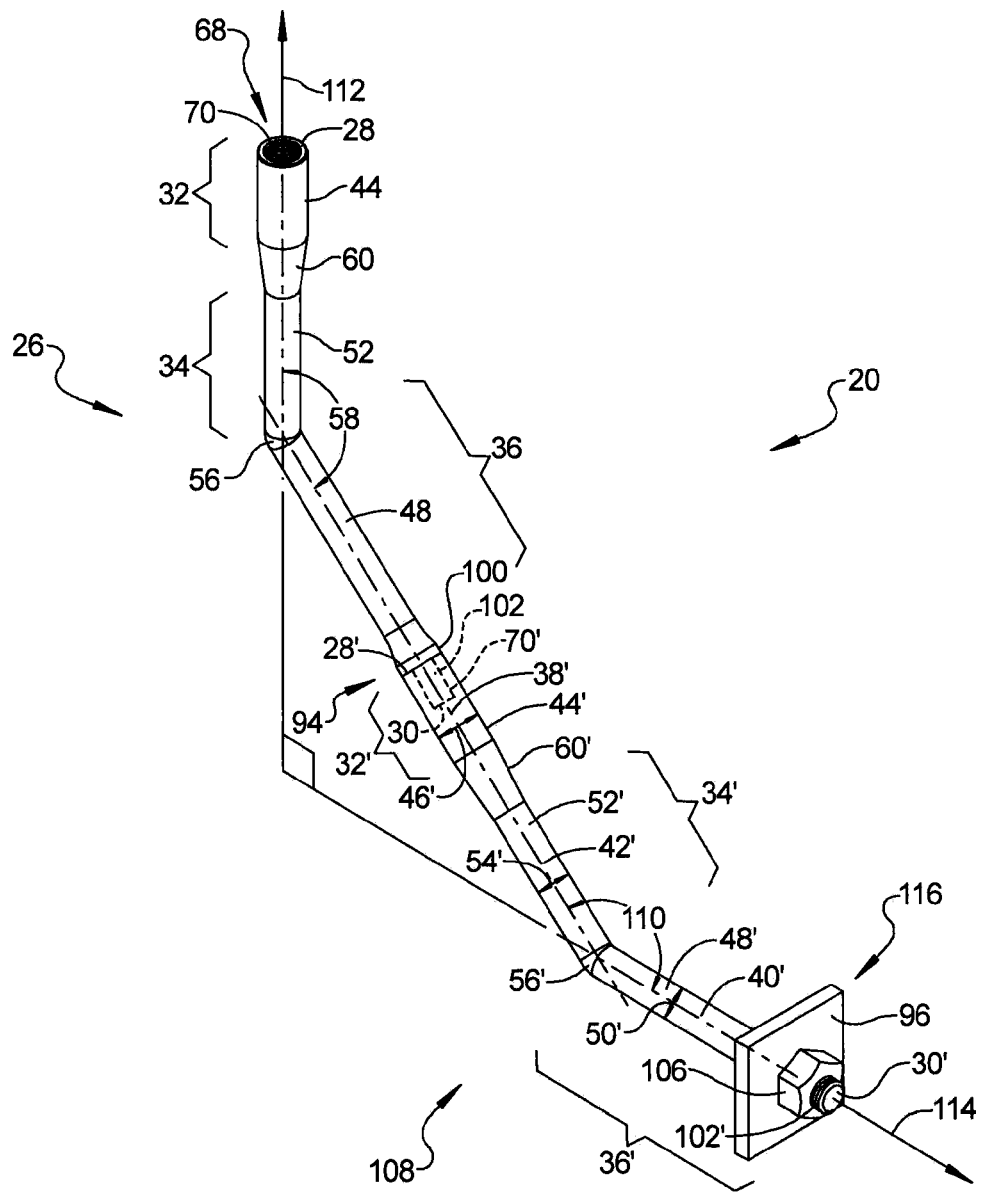
FIG. 15 is a side perspective view of another exemplary anchor bolt device constructed in accordance with the subject disclosure where the exemplary anchor bolt device includes a first anchor bolt coupled to a second anchor bolt.
Figure 16:
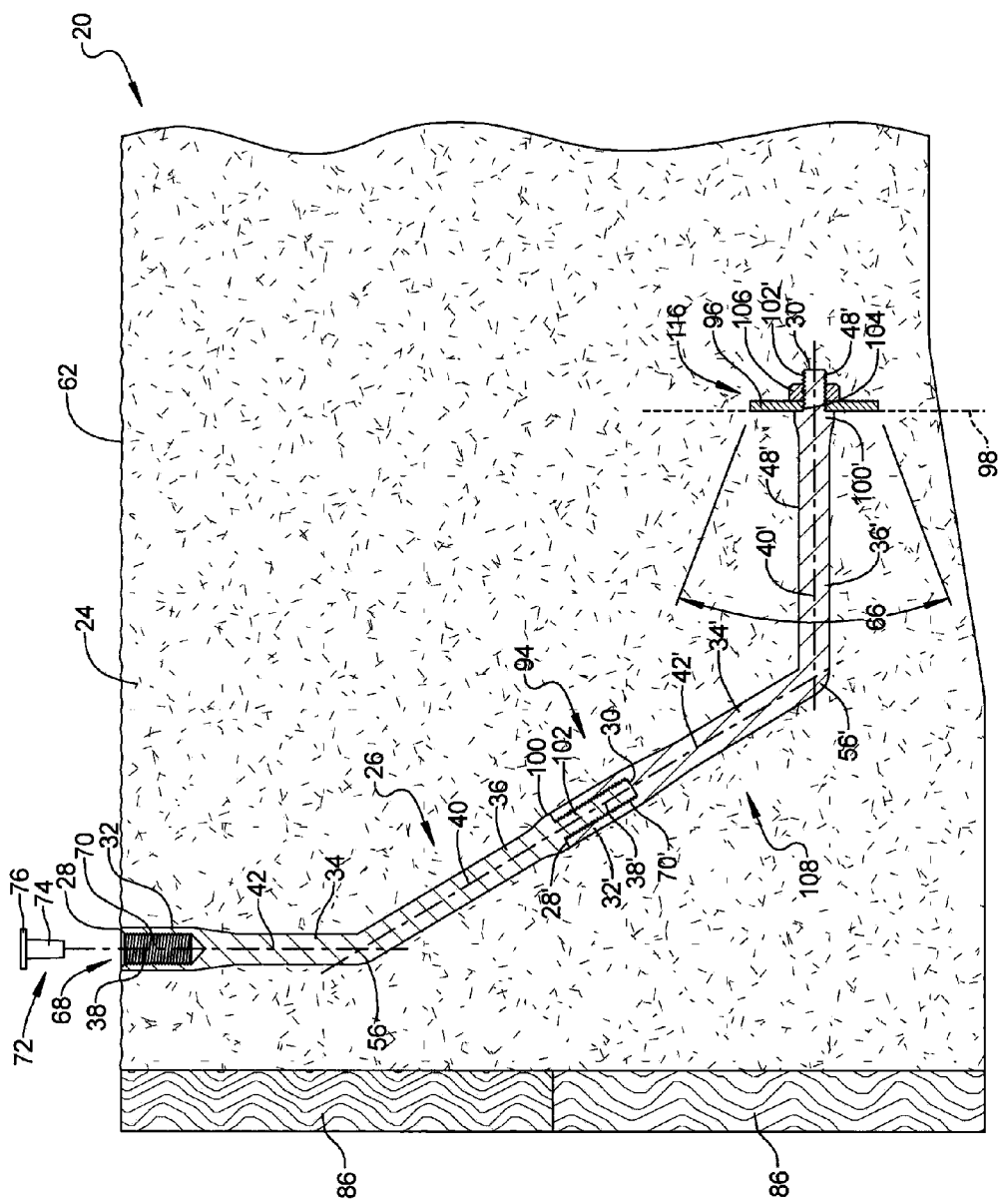
FIG. 16 is a partially exploded, side cross-sectional view of the exemplary anchor bolt device illustrated in FIG. 15 where the exemplary anchor bolt device has been embedded in a concrete foundation and includes a first stop member coupled to the second anchor bolt.
Figure 17:
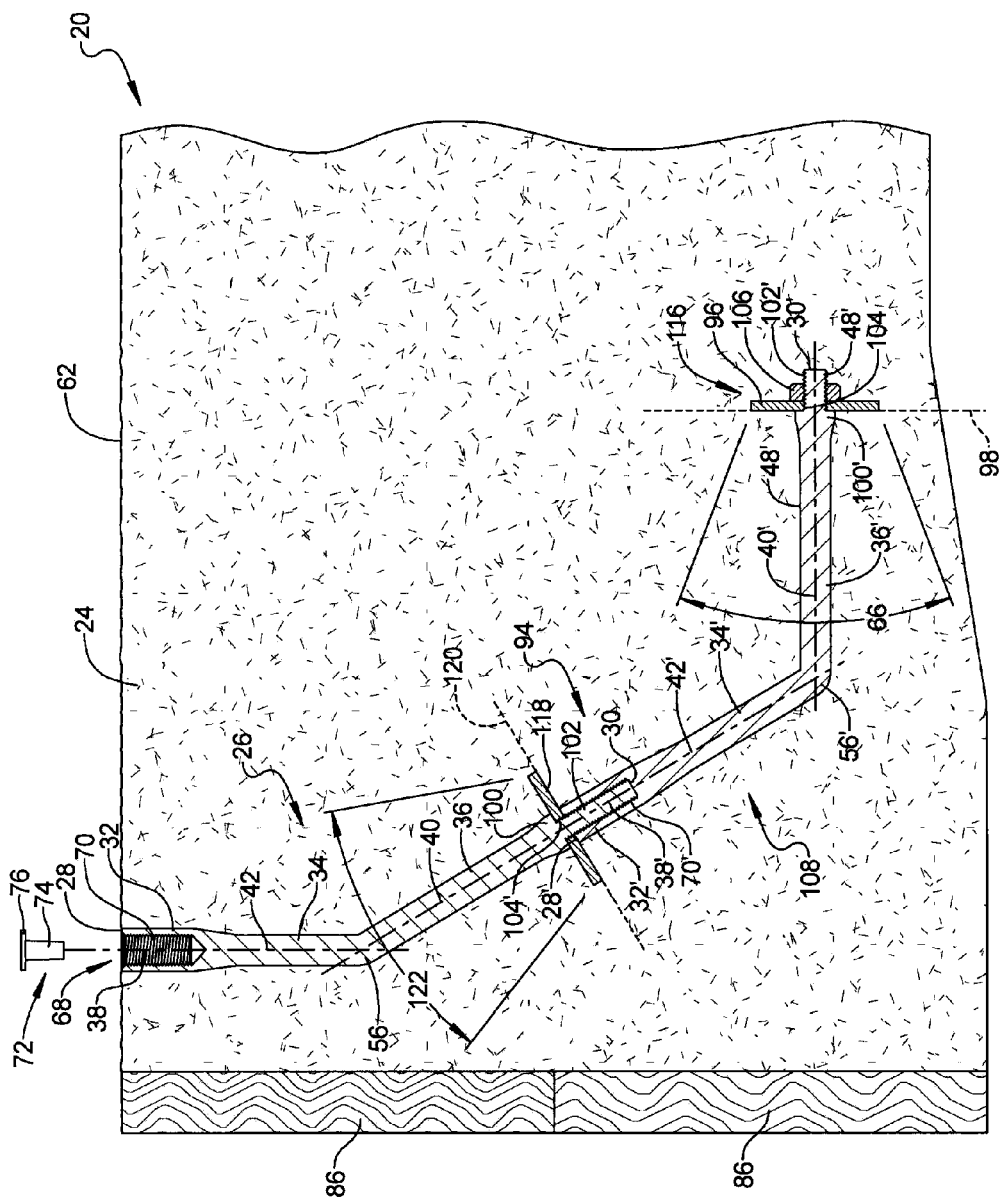
FIG. 17 is another partially exploded, side cross-sectional view of the exemplary anchor bolt device illustrated in FIG. 16 where the exemplary anchor bolt device further includes a second stop member that is mounted between the first and second anchor bolts.

As shown in FIGS. 15-17, the second anchor bolt 108 includes a bend 56' disposed between the shank portion 34' and the tail portion 36' of the second anchor bolt 108. The shank portion centerline 42' and the tail portion centerline 40' of the second anchor bolt 108 intersect one another at a second angle 110 at the bend 56' of the second anchor bolt 108. The second angle 110 between the shank portion centerline 42' and the tail portion centerline 40' of the second anchor bolt 108 may range from 40 degrees to 50 degrees. By way of example and without limitation, the second angle 110 is illustrated as equaling 45 degrees in FIGS. 15-17. Accordingly, the sum of the first angle 58 of the bend 56 in the first anchor bolt 26 and the second angle 110 of the bend 56' in the second anchor bolt 108 may equal 90 degrees. It is further noted that FIG. 15 shows the forces 112, 114 that the anchor bolt device 20 may experience during operation, including an uplift force 112 that is applied to the enlarged portion 32 of the first anchor bolt 26 and a counter force 114 that is applied to the tail portion 36' of the second anchor bolt 108. It should be appreciated that the counter force 114 is generated by the concrete foundation 24 when the uplift force 112 is applied to the enlarged portion 32 of the first anchor bolt 26. Advantageously, the bend 56 in the first anchor bolt 26 and/or the bend 56' in the second anchor bolt 108 changes the orientation of the counter force 114 relative to the uplift force 112 such that the counter force 114 is not parallel with the uplift force 112. This can result in distributing the uplift force 112 across more of the concrete foundation 24 for improved pull-out resistance.

With continued reference to FIGS. 15-17, the anchor bolt device 20 includes a third coupling 116 that is disposed at the second end 30' of the second anchor bolt 108. The third coupling 116 includes a collar 100' extending outwardly from the exterior surface 48' of the tail portion 36' of the second anchor bolt 108 and a stud 102' disposed between the collar 100' of the third coupling 116 and the second end 30' of the second anchor bolt 108. Although the collar 100' and the stud 102' of the third coupling 116 may be constructed in various ways, the collar 100' of the third coupling 116 has a fluted shape and the stud 102' of the third coupling 116 is externally threaded in the illustrated examples.

As shown in FIGS. 16 and 17, the second anchor bolt 108 is entirely received in the concrete foundation 24 such that the second anchor bolt 108 is completely embedded in the concrete foundation 24. FIG. 16 also shows that the anchor bolt device 20 may optionally include the first stop member 96 connected to the tail portion 36' of the second anchor bolt 108 at the third coupling 116 and FIG. 17 shows that the anchor bolt device 20 may additionally include a second stop member 118 connected to the tail portion 36 of the first anchor bolt 26 at the second coupling 94. Advantageously, the bend 56 in the first anchor bolt 26 and/or the bend 56' in the second anchor bolt 108 allow the first stop member 96 and/or the second stop member 118 to be positioned further away from the form boards 86 and therefore more centrally located in the concrete foundation 24. This is particularly beneficial where the first end 28 of the first anchor bolt 26 needs to be positioned near one of the form boards 86. By positioning the first stop member 96 and/or the second stop member 118 where the concrete foundation 24 is the strongest, the pull-out resistance of the anchor bolt device 20 is increased.

Where the anchor bolt device 20 includes the first stop member 96 (FIG. 15), the first stop member 96 connects to the second end 30 of the second anchor bolt 108 by the third coupling 116. Specifically, the first stop member 96 extends outwardly away from the exterior surface 48 of the tail portion 36 of the second anchor bolt 108. Although the first stop member 96 may be constructed in various ways, the first stop member 96 may have a plate-like shape and may extend in the first stop member plane 98, which is oblique to the tail portion centerline 40' of the second anchor bolt 108 in this embodiment. As such, the first fracture cone 66 in the concrete foundation 24 that is created by the first stop member 96 is conical in shape and encompasses the shank portion 34' of the second anchor bolt 108. The through-bore 104 in the first stop member 96 thus receives the stud 102' of the third coupling 116. The nut 106 is threadably received on the stud 102' of the third coupling 116 for retaining the first stop member 96 on the stud 102' of the third coupling 116. Accordingly, the first stop member 96 is retained between the collar 100' of the third coupling 116 (which extends from the exterior surface 48' of the tail portion 36' of the second anchor bolt 108) and the nut 106.

Where the anchor bolt device 20 includes both the first stop member 96 and the second stop member 118 (FIG. 16), the second stop member 118 is disposed between the collar 100 of the second coupling 94 (which extends from the exterior surface 48 of the tail portion 36 of the first anchor bolt 26) and the first end 28' of the second anchor bolt 108. The second stop member 118 extends outwardly away from the exterior surface 48 of the tail portion 36 of the first anchor bolt 26. Although the second stop member 118 may be constructed in various ways, the second stop member 118 may have a plate-like shape and may extend in a second stop member plane 120 that is oblique to the tail portion centerline 40 of the first anchor bolt 26. As such, the second stop member 118 creates a second fracture cone 122 in the concrete foundation 24 that is conical in shape and that encompasses the shank portion 34 of the first anchor bolt 26. The second stop member 118 includes a through-bore 104' that receives the stud 102 of the second coupling 94. Therefore, the second stop member 118 is retained on the anchor bolt device 20 when the stud 102 of the second coupling 94 (which is part of the first anchor bolt 26) is inserted through the through-bore 104' in the second stop member 118 and is threaded into the female tap portion 70' of the second coupling 94 (which extends into the enlarged portion 32' of the second anchor bolt 108).

Figure 18:
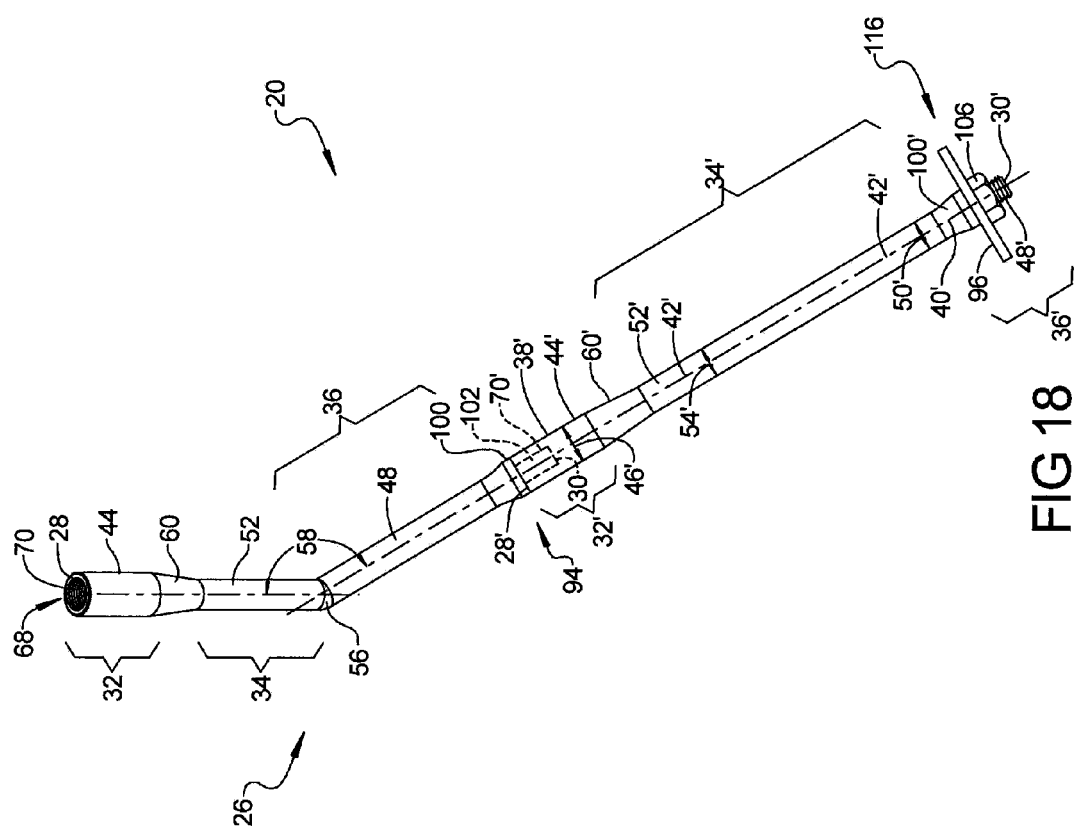
FIG. 18 is a side perspective view of another exemplary anchor bolt device constructed in accordance with the subject disclosure where the exemplary anchor bolt device includes a first anchor bolt that is bent and a second anchor bolt that is straight.
Figure 19:
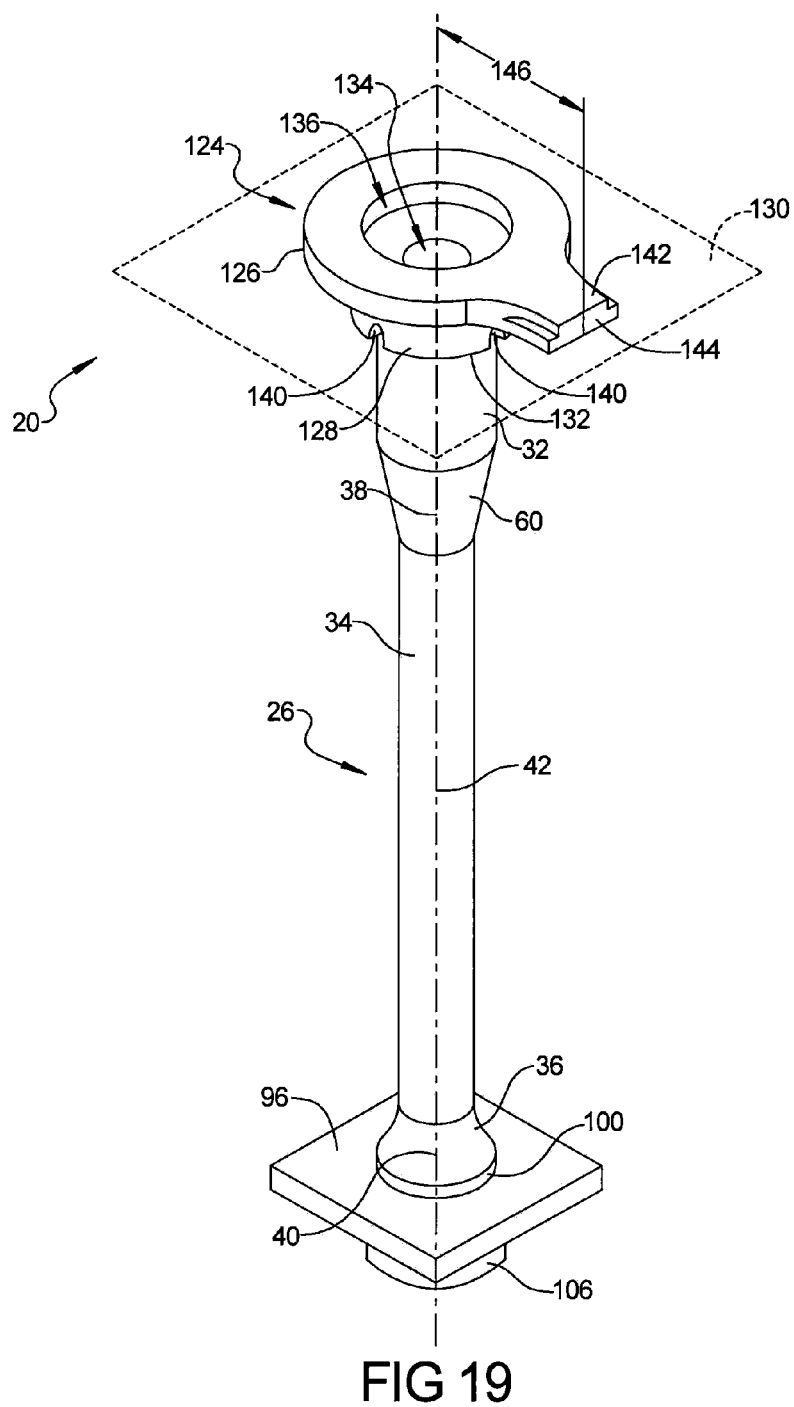
FIG. 19 is a side perspective view of another exemplary anchor bolt device constructed in accordance with the subject disclosure where the exemplary anchor bolt device includes a float.
Figure 20:
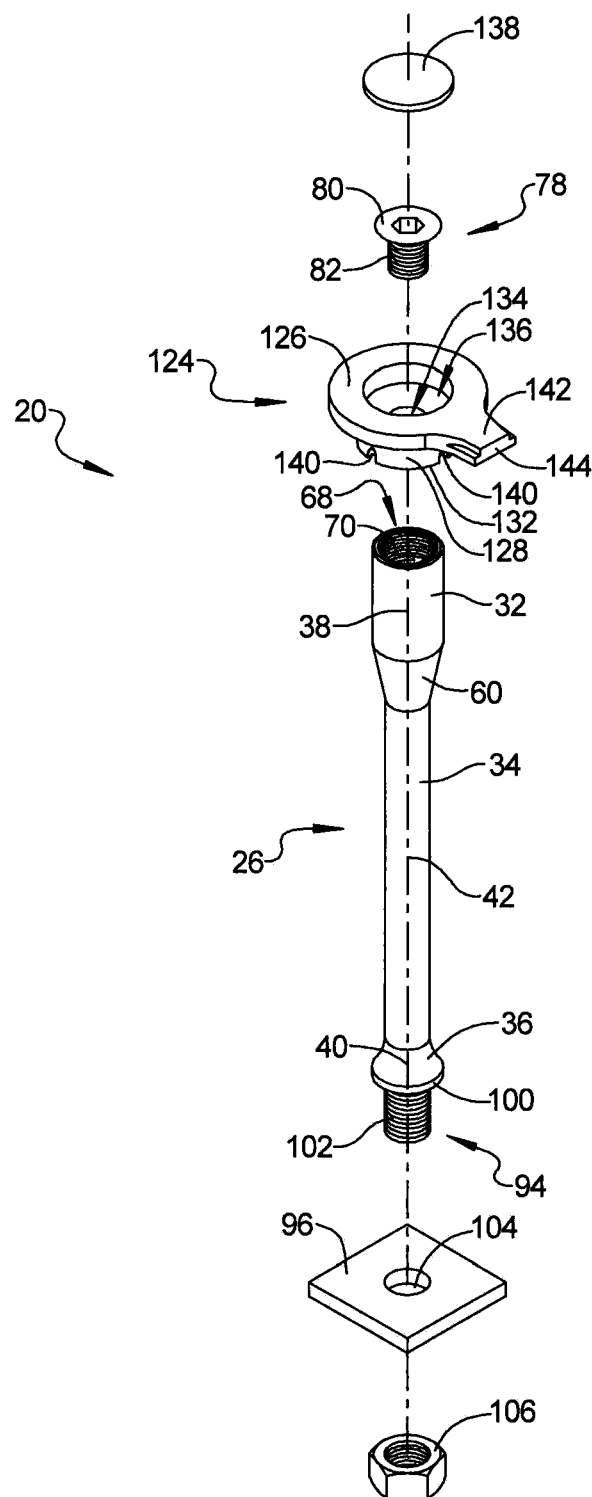
FIG. 20 is an exploded, side perspective view of the exemplary anchor bolt device illustrated in FIG. 19.

It should be appreciated that all of the variations described above in connection with the first anchor bolt 26 may also be applied to the second anchor bolt 108. For example, the second anchor bolt 108 may include a transition portion 60' disposed between the enlarged portion 32' and the shank portion 34' of the second anchor bolt 108. The enlarged portion cross-section 46', the tail portion cross-section 50', and the shank portion cross-section 54' of the second anchor bolt 108 may all be circular in shape as shown in the illustrated examples. Alternatively, the enlarged portion cross-section 46' and/or the shank portion cross-section 54' of the second anchor bolt 108 may have at least one flat side (like that shown in FIGS. 6-9) for opposing rotation of the second anchor bolt 108 with respect to the concrete foundation 24. The outer surface 52' of the shank portion 34' of the second anchor bolt 108 may alternatively have at least one twisted flat section (like that shown in FIG. 10) that extends helically along the shank portion 34' of the second anchor bolt 108. The enlarged portion centerline 38', the shank portion centerline 42', and the tail portion centerline 40' of the second anchor bolt 108 may be straight, as shown in FIGS. 15-18, or may be curved, where different combinations are of straight and curved sections are possible. With reference to FIG. 18, the first anchor bolt 26 may be bent while the second anchor bolt 108 may be straight. In accordance with this configuration, the first anchor bolt 26 includes bend 56 between the shank portion 34 and the tail portion 36 of the first anchor bolt 26, while the enlarged portion centerline 38', the shank portion centerline 42', and the tail portion centerline 40' of the second anchor bolt 108 are straight and are co-axially aligned with one another. Therefore, the first stop member 96 is disposed at a different orientation relative to the shank portion 34 of the first anchor bolt 26 than that shown in FIGS. 15-17.

With reference to FIGS. 19-23, the anchor bolt device 20 may further include a float 124 that is removably retained on the enlarged portion 32 of the first anchor bolt 26. As such, the float 124 is generally positioned on the first anchor bolt 26 opposite the first stop member 96 and the nut 106. The float 124 generally includes a base plate 126 and a neck 128, which may be integral with one another. The base plate 126 of the float 124 extends in a base plate plane 130 that is oblique to the enlarged portion centerline 38 of the first anchor bolt 26. It should be appreciated that in use, the float 124 may be positioned on the concrete foundation 24 such that the neck 128 is at least partially embedded in the concrete foundation 24 and such that the base plate plane 130 is aligned with the mounting surface 62 of the concrete foundation 24. Accordingly, the base plate 126 sits atop the mounting surface 62 of the concrete foundation 24 and floats 124 the anchor bolt device 20 in the concrete foundation 24 as the concrete foundation 24 cures.

The neck 128 of the float 124 depends from the base plate 126 to a rim 132 that is spaced from the base plate 126 in a direction that is parallel to the enlarged portion centerline 38 of the first anchor bolt 26. The neck 128 of the float 124 extends annularly about at least part of the enlarged portion 32 of the first anchor bolt 26 and defines a cavity 134 that extends inwardly into the neck 128 of the float 124 from the rim 132. The cavity 134 is sized to receive the first end 28 of the first anchor bolt 26 and at least part of the enlarged portion 32 of the first anchor bolt 26. The float 124 may optionally be removably retained on the enlarged portion 32 of the first anchor bolt 26 by a friction fit between the neck 128 of the float 124 and at least part of the outside surface 44 of the enlarged portion 32 of the first anchor bolt 26. The base plate 126 and the neck 128 of the float 124 may also cooperatively define a recess 136 in the float 124 opposite the rim 132 that opens to the cavity 134 of the float 124. The recess 136 in the float 124 is sized to receive the fastener 78 and more particularly, the head 80 of the fastener 78. The shaft 82 of the fastener 78 may thus be inserted through the recess 136 and the cavity 134 in the float 124 and threaded into the female tap portion 70 of the first coupling 68 such that the fastener 78 temporarily retains the float 124 on the enlarged portion 32 of the first anchor bolt 26 while the concrete foundation 24 cures. A flexible cover 138 may also be provided. The flexible cover 138 is sized to be received in the recess 136 in the float 124 for covering the head 80 of the fastener 78 when the fastener 78 is received in the recess 136 and the cavity 134 of the float 124. Accordingly, the flexible cover 138 helps protect the head 80 of the fastener 78 from splatter when the concrete foundation 24 is being poured, leveled, and/or finished.

Figure 21:
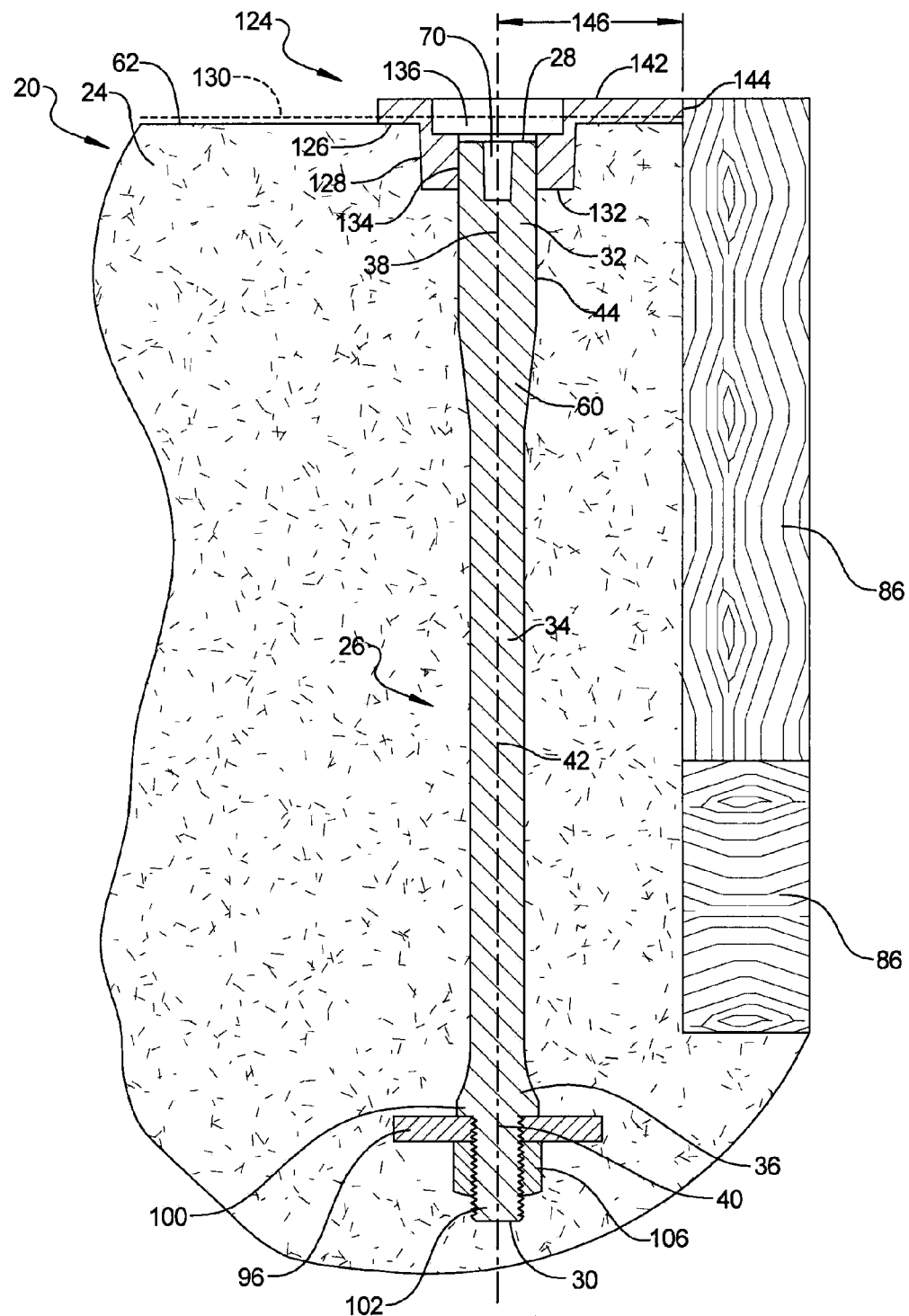
FIG. 21 is a side cross-sectional view of the exemplary anchor bolt device illustrated in FIG. 19 where the exemplary anchor bolt device has been embedded in a concrete foundation.
Figure 22:
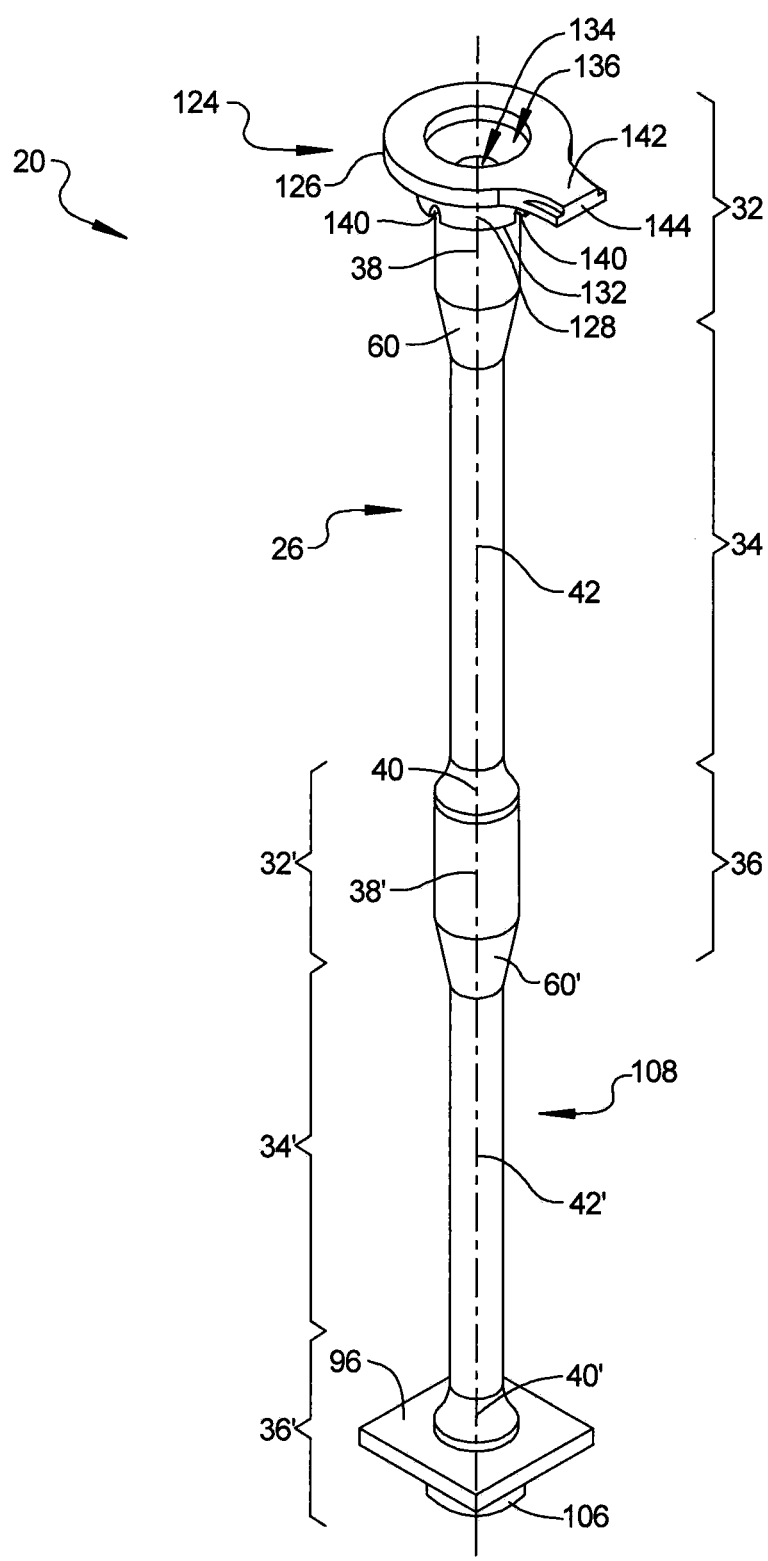
FIG. 22 is a side perspective view of another exemplary anchor bolt device constructed in accordance with the subject disclosure where the exemplary anchor bolt device includes a first anchor bolt, a float coupled to a first end of the first anchor bolt, and a second anchor bolt coupled to a second end of the first anchor bolt.
Figure 23:
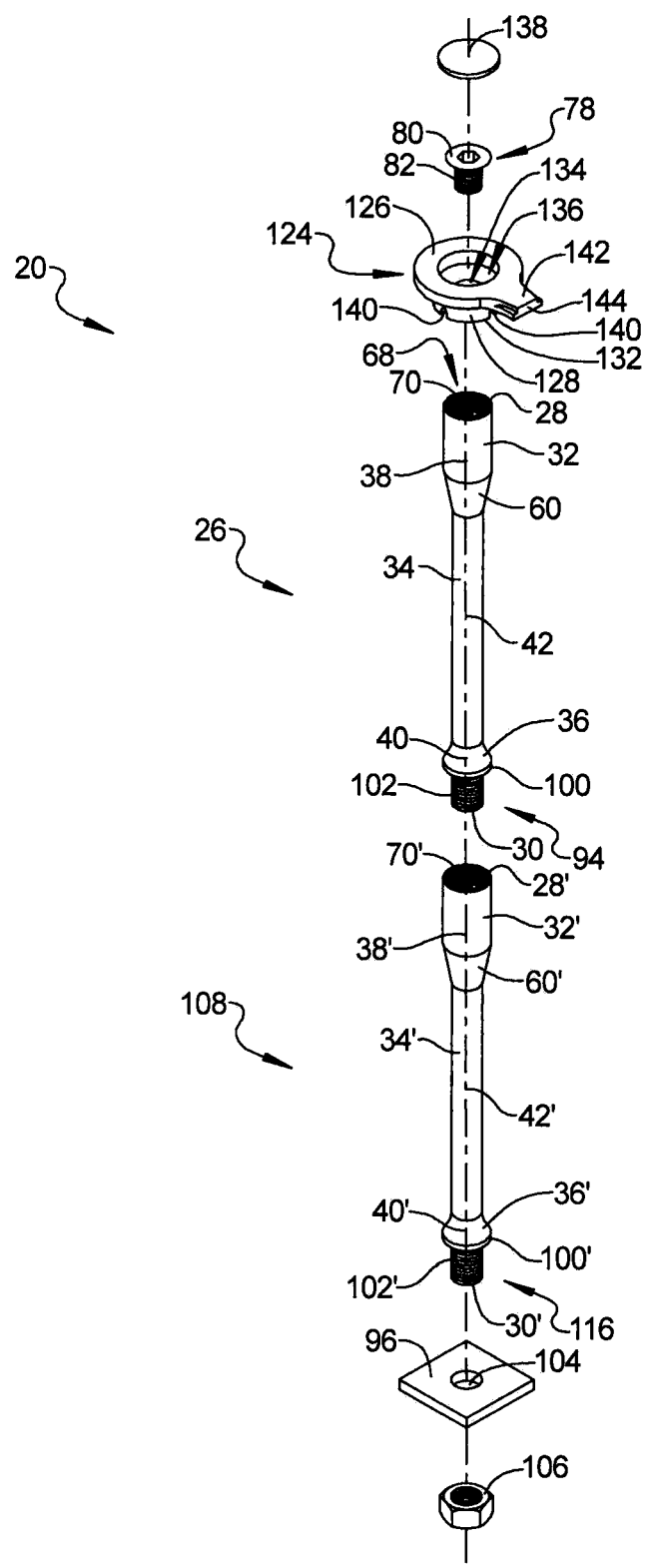
FIG. 23 is an exploded, side perspective view of the exemplary anchor bolt device illustrated in FIG. 22.

The neck 128 of the float 124 may optionally include one or more vents 140 that extend through the neck 128 and open into the cavity 134. The vents 140 relieve air from behind (i.e. under) the base plate 126 of the float 124 as the float 124 is pushed into the concrete foundation 24 from the mounting surface 62. The vents 140 let a small amount of concrete enter the cavity 134 of the float 124 to improve retention of the first anchor bolt 26 in the concrete foundation 24. This allows for the creation of a better bond between the concrete foundation 24 and the enlarged portion 32 of the first anchor bolt 26 as the concrete foundation 24 cures. Although various constructions of the vents 140 are possible, in the illustrated example, the vents 140 are in the form of slots or notches that extend from the rim 132 of the neck 128 towards the base plate 126 of the float 124. Optionally, the float 124 may also include an offset tab 142 that extends outwardly from the base plate 126 to a distal edge 144. As such, the offset tab 142 may be disposed in the base plate plane 130. The offset tab 142 defines an offset distance 146 that is measurable in the base plate plane 130 between the enlarged portion centerline 38 of the first anchor bolt 26 and the distal edge 144 of the float 124. As shown in FIG. 21, by placing the distal edge 144 of the float 124 in an abutting relationship with one of the form boards 86 of the concrete foundation 24, the offset tab 142 can be used to space the enlarged portion 32 of the first anchor bolt 26 away from the form board 86 by the offset distance 146. With reference to FIGS. 22 and 23, the float 124 is equally applicable to configurations where the anchor bolt device 20 includes both the first anchor bolt 26 and the second anchor bolt 108. In such configurations, the float 124 is removably retained on the enlarged portion 32 of the first anchor bolt 26, which is positioned opposite the first stop member 96 and the nut 106. It should also be appreciated that FIGS. 22 and 23 illustrate an embodiment where both the first and second anchor bolts 26, 108 are straight. In other words, the enlarged portion centerline 38, the tail portion centerline 40, and the shank portion centerline 42 of the first anchor bolt 26 and the enlarged portion centerline 38', the tail portion centerline 40', and the shank portion centerline 42' of the second anchor bolt 108 are straight and are all co-axially aligned with one another.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "the" in the apparatus claims refers to an antecedent that is a positive recitation meant to be included in the coverage of the claims whereas the word "the" precedes a word not meant to be included in the coverage of the claims.

What is claimed is:

1. An anchor bolt device for securing a structural member to a concrete foundation, said anchor bolt device comprising:
   a first anchor bolt extending continuously between a first end and a second end, said first anchor bolt having an enlarged portion, a shank portion, and a tail portion;
   said enlarged portion, said shank portion, and said tail portion of said anchor bolt being integral with each other such that said enlarged portion, said shank portion, and said tail portion of said anchor bolt rotate together as a single unit;
   said enlarged portion of said first anchor bolt extending from said first end of said first anchor bolt along an enlarged portion centerline, said enlarged portion of said first anchor bolt defining an enlarged portion cross-section that is transverse to said enlarged portion centerline of said first anchor bolt;
   said tail portion of said first anchor bolt extending from said second end of said first anchor bolt along a tail portion centerline, said tail portion of said first anchor bolt defining a tail portion cross-section that is transverse to said tail portion centerline of said first anchor bolt;
   said shank portion of said first anchor bolt being disposed between said enlarged portion and said tail portion of said first anchor bolt and extending along a shank portion centerline, said shank portion of said first anchor bolt defining a shank portion cross-section that is transverse to said shank portion centerline of said first anchor bolt, said shank portion cross-section being smaller than said enlarged portion cross-section; and
   a first coupling disposed at said first end of said first anchor bolt for securing said first anchor bolt to the structural member, said first coupling including a female tap portion that extends inwardly from said first end of said first anchor bolt into said enlarged portion of said first anchor bolt.

2. The anchor bolt device as set forth in claim 1 further comprising:
   a fastener including a head and a shaft, said shaft of said fastener being sized to extend into and be retained by said female tap portion of said first coupling, said head of said fastener being configured to abut said structural member and secure the structural member to said enlarged portion of said first anchor bolt.

3. The anchor bolt device as set forth in claim 2 wherein said female tap portion is internally threaded, said shaft of said fastener is externally threaded and is threadably retained in said female tap portion of said first coupling, said shaft of said fastener is sized to be received in an opening disposed in and extending through the structural member, and said head of said fastener is sized to abut said structural member adjacent the opening and secure the structural member to said enlarged portion of said first anchor bolt.

4. The anchor bolt device as set forth in claim 1 wherein said first anchor bolt includes a bend disposed between said shank portion and said tail portion of said first anchor bolt where said shank portion centerline and said tail portion centerline intersect one another at an angle.

5. The anchor bolt device as set forth in claim 4 wherein said tail portion has a pre-determined length that is measurable along said tail portion centerline such that said tail portion of said first anchor bolt defines a fracture cone in the concrete foundation that opposes removal of said first anchor bolt from the concrete foundation.

6. The anchor bolt device as set forth in claim 4 wherein said angle between said shank portion centerline and said tail portion centerline at said bend ranges from 85 degrees to 95 degrees.

7. The anchor bolt device as set forth in claim 1 further comprising:
   a second coupling disposed at said tail portion of said first anchor bolt.

8. The anchor bolt device as set forth in claim 7 further comprising:
   a stop member connected to said tail portion of said first anchor bolt by said second coupling, said tail portion including an exterior surface disposed between said second end of said first anchor bolt and said skank portion of said first anchor bolt, and said stop member extending outwardly away from said exterior surface of said tail portion of said first anchor bolt.

9. The anchor bolt device as set forth in claim 8 wherein said second coupling includes a collar extending outwardly from said exterior surface of said tail portion of said first anchor bolt and a stud disposed between said collar and said second end of said first anchor bolt.

10. The anchor bolt device as set forth in claim 9 wherein said stud of said second coupling is externally threaded, said stop includes a through-bore that receives said stud of said second coupling, and a nut is threadably received on said stud of said second coupling for retaining said stop member on said stud of said second coupling such that said stop member is retained between said collar of said second coupling and said nut.

11. The anchor bolt device as set forth in claim 8 wherein said stop member extends outwardly away from said exterior surface of said tail portion of said first anchor bolt in a stop member plane that is oblique to said tail portion centerline of said first anchor bolt to define a fracture cone in the concrete foundation that opposes removal of said first anchor bolt from the concrete foundation.

12. The anchor bolt device as set forth in claim 8 wherein said enlarged portion centerline, said shank portion centerline, and said tail portion centerline of said first anchor bolt are straight and are co-axially aligned.

13. The anchor bolt device as set forth in claim 7 further comprising:
a second anchor bolt coupled to said first anchor bolt at said second coupling, said second anchor bolt extending between a first end and a second end and said second anchor bolt having an enlarged portion, a shank portion, and a tail portion.

14. The anchor bolt device as set forth in claim 13 wherein said second coupling includes a female tap portion that extends inwardly from said first end of said second anchor bolt into said enlarged portion of said second anchor bolt.

15. The anchor bolt device as set forth in claim 14 wherein said tail portion of said first anchor bolt includes an exterior surface disposed between said second end of said first anchor bolt and said shank portion of said first anchor bolt and wherein said second coupling includes a collar that extends outwardly from said exterior surface of said tail portion of said first anchor bolt and a stud disposed between said collar and said second end of said first anchor bolt, said stud of said second coupling being externally threaded, and said female tap portion of said second coupling being internally threaded such that said female tap portion of said second coupling threadably receives said stud of said second coupling to detachably couple said tail portion of said first anchor bolt to said enlarged portion of said second anchor bolt.

16. The anchor bolt device as set forth in claim 13 further comprising:
a third coupling disposed at said second end of said second anchor bolt;
a stop member connected to said second end of said second anchor bolt by said third coupling, said tail portion of said second anchor bolt including an exterior surface disposed between said second end of said second anchor bolt and said shank portion of said second anchor bolt, said stop member extending outwardly away from said exterior surface of said tail portion of said second anchor bolt to define a fracture cone in the concrete foundation that opposes removal of said first and second anchor bolts from the concrete foundation.

17. The anchor bolt device as set forth in claim 16 wherein said third coupling includes a collar extending outwardly from said exterior surface of said tail portion of said second anchor bolt and a stud disposed between said collar and said second end of said second anchor bolt, said stud of said third coupling being externally threaded, said stop member including a through-bore that receives said stud of said third coupling, and said stud of said third coupling threadably receiving a nut for retaining said stop member on said stud of said third coupling such that said stop member is retained between said collar of said third coupling and said nut.

18. The anchor bolt device as set forth in claim 1 further comprising:
a float removably retained on said enlarged portion of said first anchor bolt, said float including a base plate and a neck.

19. The anchor bolt device as set forth in claim 18 wherein said base plate of said float extends in a base plate plane that is oblique to said enlarged portion centerline of said first anchor bolt, said neck depending from said base plate to a rim that is spaced from said base plate, and said neck of said float defining a cavity therein that is sized to receive said first end of said first anchor bolt and at least part of said enlarged portion of said first anchor bolt.

20. The anchor bolt device as set forth in claim 19 wherein said base plate and said neck of said float cooperatively define a recess in said float opposite said rim that opens to said cavity of said float, said recess in said float being sized to receive a fastener for temporarily retaining said float on said enlarged portion of said first anchor bolt while the concrete foundation cures.

21. The anchor bolt device as set forth in claim 20 further comprising:
a flexible cover sized to be received in said recess of said float for covering a head of said fastener when said fastener is received in said recess of said float to protect said head of said fastener from splatter when the concrete foundation is being poured and leveled.

22. The anchor bolt device as set forth in claim 19 wherein said float includes at least one vent that extends through said neck to open into said cavity for relieving air from behind said base plate of said float as said float is pushed into the concrete foundation.

23. The anchor bolt device as set forth in claim 1 further comprising:
a thread protector including a plug section and a flange section, said plug section is sized to be received in said female tap portion of said first coupling for protecting said female tap portion of said first coupling from splatter when the concrete foundation is being poured and leveled, said flange section extending radially outwardly from said plug section, and said thread protector being closed at said flange section to prevent splatter from collecting in said plug section.

24. The anchor bolt device as set forth in claim 1 wherein said enlarged portion cross-section of said first anchor bolt has at least one flat side for opposing rotation of said enlarged portion of said first anchor bolt with respect to the concrete foundation.

25. The anchor bolt device as set forth in claim 1 wherein said shank portion of said first anchor bolt has an outer surface with at least one twisted flat section that extends helically along said shank portion.

* * * * *

UNITED STATES PATENT AND TRADEMARK OFFICE
CERTIFICATE OF CORRECTION

PATENT NO. : 9,512,593 B2  
APPLICATION NO. : 14/801118  
DATED : December 6, 2016  
INVENTOR(S) : Scott Drummond et al.

Page 1 of 1

It is certified that error appears in the above-identified patent and that said Letters Patent is hereby corrected as shown below:

On the Title Page

Column 1, (72) Inventors, delete "FL" and insert -- AL --, therefor

Signed and Sealed this
Twenty-first Day of March, 2017

Michelle K. Lee
*Director of the United States Patent and Trademark Office*